(12) United States Patent
Cheng et al.

(10) Patent No.: US 9,736,830 B2
(45) Date of Patent: Aug. 15, 2017

(54) SYSTEMS AND METHODS UTILIZING AN EFFICIENT TBS TABLE DESIGN FOR 256QAM IN A CELLULAR COMMUNICATIONS NETWORK

(71) Applicant: Telefonaktiebolaget L M Ericsson (publ), Stockholm (SE)

(72) Inventors: Jung-Fu Cheng, Fremont, CA (US); Daniel Larsson, Vallentuna (SE); Meng Wang, Sundbyberg (SE); Yu Yang, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 268 days.

(21) Appl. No.: 14/597,743

(22) Filed: Jan. 15, 2015

(65) Prior Publication Data

US 2015/0215913 A1    Jul. 30, 2015

Related U.S. Application Data

(60) Provisional application No. 61/933,343, filed on Jan. 30, 2014.

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0001* (2013.01); *H04L 5/0005* (2013.01); *H04L 27/34* (2013.01); *H04W 72/046* (2013.01)

(58) Field of Classification Search
None
See application file for complete search history.

(56) References Cited

U.S. PATENT DOCUMENTS

2010/0195614 A1    8/2010  Nimbalker et al.
2014/0126440 A1*   5/2014  Frank ............... H04W 52/06
                                                   370/311
(Continued)

FOREIGN PATENT DOCUMENTS

CN         102684816 A     9/2012

OTHER PUBLICATIONS

Panasonic, "R1-131328: Discussion on 256QAM for Downlink in Small Cell Deployments," 3rd Generation Partnership Project (3GPP), TSG-RAN WG1 Meeting 72bis, Apr. 15-19, 2013, 6 pages, Chicago, USA.

(Continued)

*Primary Examiner* — Yaotang Wang
(74) *Attorney, Agent, or Firm* — Withrow & Terranova, PLLC

(57) ABSTRACT

Systems and methods relating to the use of a Transport Block Size (TBS) table that supports 256 Quadrature Amplitude Modulation (QAM) in a cellular communications network are disclosed. In some embodiments, a wireless device determines a TBS for a downlink transmission from a radio access node to the wireless device using a TBS table that supports both a first set of modulation schemes and 256QAM. The TBS table comprises a first set of rows from a preexisting TBS table that supports the first set of modulation schemes but not 256QAM and a second set of rows added to the preexisting TBS table to provide the TBS table, where the second set of rows substantially reuse TBS values from the first set of rows. The wireless device receives the downlink transmission from the radio access node according to the Downlink Control Information (DCI) and the TBS determined for the downlink transmission.

12 Claims, 38 Drawing Sheets

| TBS_L1 | TBS_L4 |
|--------|--------|
| 76208  | 305976 |
| 78704  | 314888 |
| 81176  | 327000 |
| 84760  | 339112 |
| 87936  | 354936 |
| 90816  | 363336 |
| 93800  | 375448 |
| 97896  | 391656 |

(51) Int. Cl.
*H04L 27/34* (2006.01)
*H04L 5/00* (2006.01)

(56) References Cited

U.S. PATENT DOCUMENTS

2014/0313985 A1* 10/2014 Nimbalker .......... H04L 27/0012
370/329
2015/0103760 A1* 4/2015 Zhang ...................... H04L 1/00
370/329

OTHER PUBLICATIONS

International Search Report and Written Opinion for International Patent Application No. PCT/IB2015/050585, dated Jun. 19, 2015, 13 pages.
Author Unknown, "Technical Specification Group Radio Access Network; Evolved Universal Terrestrial Radio Access (E-UTRA); Multiplexing and channel coding (Release 11)," Technical Specification 36.212, Version 11.1.0, 3GPP Organizational Partners, Dec. 2012, 82 pages.
Author Unknown, "Technical Specification Group Radio Access Network; Evolved Universal Terrestrial Radio Access (E-UTRA); Physical layer procedures (Release 11)," Technical Specification 36.213, Version 11.1.0, 3GPP Organizatinal Partners, Dec. 2012, 160 pages.
Author Unknown, "Technical Specification Group Radio Access Network; Evolved Universal Terrestrial Radio Access (E-UTRA); User Equipment (UE) radio access capabilties (Release 11)," Technical Specification 36.306, Version 11.1.0, 3GPP Organizational Partners, Sep. 2012, 24 pages.

* cited by examiner

| CQI index | Modulation | Coding rate x 1024 | Spectral efficiency (bits per symbol) |
|---|---|---|---|
| 0 | out of range | | |
| 1 | QPSK | 78 | 0.15 |
| 2 | QPSK | 120 | 0.23 |
| 3 | QPSK | 193 | 0.38 |
| 4 | QPSK | 308 | 0.60 |
| 5 | QPSK | 449 | 0.88 |
| 6 | QPSK | 602 | 1.18 |
| 7 | 16QAM | 378 | 1.48 |
| 8 | 16QAM | 490 | 1.91 |
| 9 | 16QAM | 616 | 2.47 |
| 10 | 64QAM | 466 | 2.73 |
| 11 | 64QAM | 567 | 3.32 |
| 12 | 64QAM | 666 | 3.90 |
| 13 | 64QAM | 772 | 4.52 |
| 14 | 64QAM | 873 | 5.12 |
| 15 | 64QAM | 948 | 5.55 |

*FIG. 5*

| MCS Index ($I_{MCS}$) | Modulation ($Q_m$) | Transport block size index ($I_{TBS}$) |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | 16QAM | 9 |
| 11 | 16QAM | 10 |
| 12 | 16QAM | 11 |
| 13 | 16QAM | 12 |
| 14 | 16QAM | 13 |
| 15 | 16QAM | 14 |
| 16 | 16QAM | 15 |
| 17 | 64QAM | 15 |
| 18 | 64QAM | 16 |
| 19 | 64QAM | 17 |
| 20 | 64QAM | 18 |
| 21 | 64QAM | 19 |
| 22 | 64QAM | 20 |
| 23 | 64QAM | 21 |
| 24 | 64QAM | 22 |
| 25 | 64QAM | 23 |
| 26 | 64QAM | 24 |
| 27 | 64QAM | 25 |
| 28 | 64QAM | 26 |
| 29 | QPSK | reserved |
| 30 | 16QAM | |
| 31 | 64QAM | |

*FIG. 6*

| $I_{TBS}$ | 1 | 2 | 3 | 4 | 5 | 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

$N_{PRB}$

*FIG. 7A*

| $i_{TBS}$ | 11 | 12 | 13 | 14 | 15 | 16 | 17 | 18 | 19 | 20 |
|---|---|---|---|---|---|---|---|---|---|---|
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

$N_{PRB}$

FIG. 7B

| $I_{TBS}$ | 21 | 22 | 23 | 24 | 25 | 26 | 27 | 28 | 29 | 30 |
|---|---|---|---|---|---|---|---|---|---|---|
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |

FIG. 7C

| $I_{TBS}$ | 31 | 32 | 33 | 34 | 35 | 36 | 37 | 38 | 39 | 40 |
|---|---|---|---|---|---|---|---|---|---|---|
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10680 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 22920 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |

FIG. 7D

| $I_{TBS}$ | 41 | 42 | 43 | 44 | 45 | 46 | 47 | 48 | 49 | 50 |
|---|---|---|---|---|---|---|---|---|---|---|
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14112 | 14688 | 14112 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 25456 |
| 23 | 23688 | 24496 | 24496 | 25456 | 25456 | 26416 | 27376 | 27376 | 28336 | 27376 |
| 24 | 25456 | 25456 | 26416 | 26416 | 27376 | 28336 | 28336 | 29296 | 29296 | 28336 |
| 25 | 26416 | 26416 | 27376 | 28336 | 28336 | 29296 | 29296 | 30576 | 31704 | 30576 |
| 26 | 30576 | 30576 | 31704 | 32856 | 32856 | 34008 | 35160 | 35160 | 36696 | 36696 |

FIG. 7E

| $I_{TBS}$ | 51 | 52 | 53 | 54 | 55 | 56 | 57 | 58 | 59 | 60 |
|---|---|---|---|---|---|---|---|---|---|---|
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 19080 | 21384 | 21384 |
| 18 | 19848 | 20616 | 21384 | 21384 | 22152 | 22152 | 22920 | 20616 | 23688 | 23688 |
| 19 | 22152 | 22152 | 22920 | 22920 | 23688 | 24496 | 24496 | 22920 | 25456 | 25456 |
| 20 | 23688 | 24496 | 24496 | 25456 | 25456 | 26416 | 26416 | 25456 | 27376 | 28336 |
| 21 | 25456 | 26416 | 26416 | 27376 | 27376 | 28336 | 28336 | 27376 | 29296 | 30576 |
| 22 | 27376 | 28336 | 28336 | 29296 | 29296 | 30576 | 30576 | 29296 | 31704 | 32856 |
| 23 | 29296 | 29296 | 30576 | 30576 | 31704 | 31704 | 32856 | 31704 | 34008 | 34008 |
| 24 | 31704 | 31704 | 32856 | 32856 | 34008 | 34008 | 35160 | 32856 | 36696 | 36696 |
| 25 | 32856 | 32856 | 34008 | 34008 | 35160 | 35160 | 36696 | 35160 | 37888 | 37888 |
| 26 | 37888 | 37888 | 39232 | 40576 | 40576 | 40576 | 42368 | 36696 | 43816 | 43816 |

*FIG. 7F*

| $I_{TBS}$ | 61 | 62 | 63 | 64 | 65 | 66 | 67 | 68 | 69 | 70 |
|---|---|---|---|---|---|---|---|---|---|---|
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 16992 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 40576 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |

FIG. 7G

| $i_{TBS}$ | 71 | 72 | 73 | 74 | $N_{PRB}$ 75 | 76 | 77 | 78 | 79 | 80 |
|---|---|---|---|---|---|---|---|---|---|---|
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 17568 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 46888 | 46888 | 46888 | 48936 | 48936 | 48936 | 48936 | 51024 | 51024 |
| 26 | 52752 | 52752 | 55056 | 55056 | 55056 | 55056 | 57336 | 57336 | 57336 | 59256 |

*FIG. 7H*

| $I_{TBS}$ | 81 | 82 | 83 | 84 | 85 | 86 | 87 | 88 | 89 | 90 |
|---|---|---|---|---|---|---|---|---|---|---|
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |

$N_{PRB}$

*FIG. 7I*

| $I_{TBS}$ | 91 | 92 | 93 | 94 | 95 | 96 | 97 | 98 | 99 | 100 |
|---|---|---|---|---|---|---|---|---|---|---|
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

FIG. 7J

| $i_{TBS}$ | 101 | 102 | 103 | 104 | 105 | 106 | 107 | 108 | 109 | 110 |
|---|---|---|---|---|---|---|---|---|---|---|
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

FIG. 7K

| MCS Index ($I_{MCS}$) | Modulation ($Q_m$) | Spectral efficiency (bits per symbol) |
|---|---|---|
| 0 | QPSK | 0.23 |
| 1 | QPSK | 0.31 |
| 2 | QPSK | 0.38 |
| 3 | QPSK | 0.49 |
| 4 | QPSK | 0.60 |
| 5 | QPSK | 0.74 |
| 6 | QPSK | 0.88 |
| 7 | QPSK | 1.03 |
| 8 | QPSK | 1.18 |
| 9 | QPSK | 1.33 |
| 10 | 16QAM | 1.33 |
| 11 | 16QAM | 1.48 |
| 12 | 16QAM | 1.70 |
| 13 | 16QAM | 1.91 |
| 14 | 16QAM | 2.16 |
| 15 | 16QAM | 2.41 |
| 16 | 16QAM | 2.57 |
| 17 | 64QAM | 2.57 |
| 18 | 64QAM | 2.73 |
| 19 | 64QAM | 3.03 |
| 20 | 64QAM | 3.32 |
| 21 | 64QAM | 3.61 |
| 22 | 64QAM | 3.90 |
| 23 | 64QAM | 4.21 |
| 24 | 64QAM | 4.52 |
| 25 | 64QAM | 4.82 |
| 26 | 64QAM | 5.12 |
| 27 | 64QAM | 5.33 |
| 28 | 64QAM | 6.25 |

*FIG. 8*

| TBS_L1 | TBS_L2 | TBS_L1 | TBS_L2 | TBS_L1 | TBS_L2 | TBS_L1 | TBS_L2 |
|---|---|---|---|---|---|---|---|
| 1544 | 3112 | 3752 | 7480 | 10296 | 20616 | 28336 | 57336 |
| 1608 | 3240 | 3880 | 7736 | 10680 | 21384 | 29296 | 59256 |
| 1672 | 3368 | 4008 | 7992 | 11064 | 22152 | 30576 | 61664 |
| 1736 | 3496 | 4136 | 8248 | 11448 | 22920 | 31704 | 63776 |
| 1800 | 3624 | 4264 | 8504 | 11832 | 23688 | 32856 | 66592 |
| 1864 | 3752 | 4392 | 8760 | 12216 | 24496 | 34008 | 68808 |
| 1928 | 3880 | 4584 | 9144 | 12576 | 25456 | 35160 | 71112 |
| 1992 | 4008 | 4776 | 9528 | 12960 | 25456 | 36696 | 73712 |
| 2024 | 4008 | 4968 | 9912 | 13536 | 27376 | 37888 | 76208 |
| 2088 | 4136 | 5160 | 10296 | 14112 | 28336 | 39232 | 78704 |
| 2152 | 4264 | 5352 | 10680 | 14688 | 29296 | 40576 | 81176 |
| 2216 | 4392 | 5544 | 11064 | 15264 | 30576 | 42368 | 84760 |
| 2280 | 4584 | 5736 | 11448 | 15840 | 31704 | 43816 | 87936 |
| 2344 | 4776 | 5992 | 11832 | 16416 | 32856 | 45352 | 90816 |
| 2408 | 4776 | 6200 | 12576 | 16992 | 34008 | 46888 | 93800 |
| 2472 | 4968 | 6456 | 12960 | 17568 | 35160 | 48936 | 97896 |
| 2536 | 5160 | 6712 | 13536 | 18336 | 36696 | 51024 | 101840 |
| 2600 | 5160 | 6968 | 14112 | 19080 | 37888 | 52752 | 105528 |
| 2664 | 5352 | 7224 | 14688 | 19848 | 39232 | 55056 | 110136 |
| 2728 | 5544 | 7480 | 14688 | 20616 | 40576 | 57336 | 115040 |
| 2792 | 5544 | 7736 | 15264 | 21384 | 42368 | 59256 | 119816 |
| 2856 | 5736 | 7992 | 15840 | 22152 | 43816 | 61664 | 124464 |
| 2984 | 5992 | 8248 | 16416 | 22920 | 45352 | 63776 | 128496 |
| 3112 | 6200 | 8504 | 16992 | 23688 | 46888 | 66592 | 133208 |
| 3240 | 6456 | 8760 | 17568 | 24496 | 48936 | 68808 | 137792 |
| 3368 | 6712 | 9144 | 18336 | 25456 | 51024 | 71112 | 142248 |
| 3496 | 6968 | 9528 | 19080 | 26416 | 52752 | 73712 | 146856 |
| 3624 | 7224 | 9912 | 19848 | 27376 | 55056 | 75376 | 149776 |

*FIG. 9*

| TBS_L1 | TBS_L3 | TBS_L1 | TBS_L3 | TBS_L1 | TBS_L3 | TBS_L1 | TBS_L3 |
|---|---|---|---|---|---|---|---|
| 1032 | 3112 | 2664 | 7992 | 8248 | 24496 | 26416 | 78704 |
| 1064 | 3240 | 2728 | 8248 | 8504 | 25456 | 27376 | 81176 |
| 1096 | 3240 | 2792 | 8248 | 8760 | 26416 | 28336 | 84760 |
| 1128 | 3368 | 2856 | 8504 | 9144 | 27376 | 29296 | 87936 |
| 1160 | 3496 | 2984 | 8760 | 9528 | 28336 | 30576 | 90816 |
| 1192 | 3624 | 3112 | 9144 | 9912 | 29296 | 31704 | 93800 |
| 1224 | 3624 | 3240 | 9528 | 10296 | 30576 | 32856 | 97896 |
| 1256 | 3752 | 3368 | 9912 | 10680 | 31704 | 34008 | 101840 |
| 1288 | 3880 | 3496 | 10296 | 11064 | 32856 | 35160 | 105528 |
| 1320 | 4008 | 3624 | 10680 | 11448 | 34008 | 36696 | 110136 |
| 1352 | 4008 | 3752 | 11064 | 11832 | 35160 | 37888 | 115040 |
| 1384 | 4136 | 3880 | 11448 | 12216 | 36696 | 39232 | 119816 |
| 1416 | 4264 | 4008 | 11832 | 12576 | 37888 | 40576 | 119816 |
| 1480 | 4392 | 4136 | 12576 | 12960 | 39232 | 42368 | 128496 |
| 1544 | 4584 | 4264 | 12960 | 13536 | 40576 | 43816 | 133208 |
| 1608 | 4776 | 4392 | 12960 | 14112 | 42368 | 45352 | 137792 |
| 1672 | 4968 | 4584 | 13536 | 14688 | 43816 | 46888 | 142248 |
| 1736 | 5160 | 4776 | 14112 | 15264 | 45352 | 48936 | 146856 |
| 1800 | 5352 | 4968 | 14688 | 15840 | 46888 | 51024 | 152976 |
| 1864 | 5544 | 5160 | 15264 | 16416 | 48936 | 52752 | 157432 |
| 1928 | 5736 | 5352 | 15840 | 16992 | 51024 | 55056 | 165216 |
| 1992 | 5992 | 5544 | 16416 | 17568 | 52752 | 57336 | 171888 |
| 2024 | 5992 | 5736 | 16992 | 18336 | 55056 | 59256 | 177816 |
| 2088 | 6200 | 5992 | 18336 | 19080 | 57336 | 61664 | 185728 |
| 2152 | 6456 | 6200 | 18336 | 19848 | 59256 | 63776 | 191720 |
| 2216 | 6712 | 6456 | 19080 | 20616 | 61664 | 66592 | 199824 |
| 2280 | 6712 | 6712 | 19848 | 21384 | 63776 | 68808 | 205880 |
| 2344 | 6968 | 6968 | 20616 | 22152 | 66592 | 71112 | 214176 |
| 2408 | 7224 | 7224 | 21384 | 22920 | 68808 | 73712 | 221680 |
| 2472 | 7480 | 7480 | 22152 | 23688 | 71112 | 75376 | 226416 |
| 2536 | 7480 | 7736 | 22920 | 24496 | 73712 | | |
| 2600 | 7736 | 7992 | 23688 | 25456 | 76208 | | |

*FIG. 10*

| TBS_L1 | TBS_L4 | TBS_L1 | TBS_L4 | TBS_L1 | TBS_L4 | TBS_L1 | TBS_L4 |
|---|---|---|---|---|---|---|---|
| 776 | 3112 | 2280 | 9144 | 7224 | 29296 | 24496 | 97896 |
| 808 | 3240 | 2344 | 9528 | 7480 | 29296 | 25456 | 101840 |
| 840 | 3368 | 2408 | 9528 | 7736 | 30576 | 26416 | 105528 |
| 872 | 3496 | 2472 | 9912 | 7992 | 31704 | 27376 | 110136 |
| 904 | 3624 | 2536 | 10296 | 8248 | 32856 | 28336 | 115040 |
| 936 | 3752 | 2600 | 10296 | 8504 | 34008 | 29296 | 115040 |
| 968 | 3880 | 2664 | 10680 | 8760 | 35160 | 30576 | 124464 |
| 1000 | 4008 | 2728 | 11064 | 9144 | 36696 | 31704 | 128496 |
| 1032 | 4136 | 2792 | 11064 | 9528 | 37888 | 32856 | 133208 |
| 1064 | 4264 | 2856 | 11448 | 9912 | 39232 | 34008 | 137792 |
| 1096 | 4392 | 2984 | 11832 | 10296 | 40576 | 35160 | 142248 |
| 1128 | 4584 | 3112 | 12576 | 10680 | 42368 | 36696 | 146856 |
| 1160 | 4584 | 3240 | 12960 | 11064 | 43816 | 37888 | 151376 |
| 1192 | 4776 | 3368 | 13536 | 11448 | 45352 | 39232 | 157432 |
| 1224 | 4968 | 3496 | 14112 | 11832 | 46888 | 40576 | 161760 |
| 1256 | 4968 | 3624 | 14688 | 12216 | 48936 | 42368 | 169544 |
| 1288 | 5160 | 3752 | 15264 | 12576 | 51024 | 43816 | 175600 |
| 1320 | 5352 | 3880 | 15264 | 12960 | 51024 | 45352 | 181656 |
| 1352 | 5352 | 4008 | 15840 | 13536 | 55056 | 46888 | 187712 |
| 1384 | 5544 | 4136 | 16416 | 14112 | 57336 | 48936 | 195816 |
| 1416 | 5736 | 4264 | 16992 | 14688 | 59256 | 51024 | 203704 |
| 1480 | 5992 | 4392 | 17568 | 15264 | 61664 | 52752 | 211936 |
| 1544 | 6200 | 4584 | 18336 | 15840 | 63776 | 55056 | 220296 |
| 1608 | 6456 | 4776 | 19080 | 16416 | 66592 | 57336 | 230104 |
| 1672 | 6712 | 4968 | 19848 | 16992 | 68808 | 59256 | 236160 |
| 1736 | 6968 | 5160 | 20616 | 17568 | 71112 | 61664 | 245648 |
| 1800 | 7224 | 5352 | 21384 | 18336 | 73712 | 63776 | 254328 |
| 1864 | 7480 | 5544 | 22152 | 19080 | 76208 | 66592 | 266440 |
| 1928 | 7736 | 5736 | 22920 | 19848 | 78704 | 68808 | 275376 |
| 1992 | 7992 | 5992 | 23688 | 20616 | 81176 | 71112 | 284608 |
| 2024 | 7992 | 6200 | 24496 | 21384 | 84760 | 73712 | 293736 |
| 2088 | 8248 | 6456 | 25456 | 22152 | 87936 | 75376 | 299856 |
| 2152 | 8504 | 6712 | 26416 | 22920 | 90816 | | |
| 2216 | 8760 | 6968 | 28336 | 23688 | 93800 | | |

*FIG. 11*

| $I_{TBS}$ | 1 | 2 | 3 | 4 | 5 | 6 | 7 | 8 | 9 | 10 |
|---|---|---|---|---|---|---|---|---|---|---|
| 27 | 648 | 1320 | 1992 | 2664 | 3368 | 4008 | 4584 | 5352 | 5992 | 6712 |
| 28 | 696 | 1416 | 2152 | 2856 | 3624 | 4264 | 4968 | 5736 | 6456 | 7224 |
| 29 | 744 | 1480 | 2280 | 2984 | 3752 | 4584 | 5352 | 5992 | 6712 | 7480 |
| 30 | 776 | 1608 | 2408 | 3240 | 4008 | 4776 | 5736 | 6456 | 7224 | 7992 |
| 31 | 840 | 1672 | 2536 | 3368 | 4264 | 5160 | 5992 | 6712 | 7736 | 8504 |
| 32 | 872 | 1736 | 2664 | 3496 | 4392 | 5352 | 6200 | 6968 | 7992 | 8760 |

| $I_{TBS}$ | 11 | 12 | 13 | 14 | 15 | 16 | 17 | 18 | 19 | 20 |
|---|---|---|---|---|---|---|---|---|---|---|
| 27 | 7224 | 7992 | 8504 | 9144 | 9912 | 10680 | 11448 | 11832 | 12576 | 12960 |
| 28 | 7736 | 8504 | 9144 | 9912 | 10680 | 11448 | 12216 | 12960 | 13536 | 14112 |
| 29 | 8248 | 9144 | 9912 | 10680 | 11448 | 12216 | 12960 | 13536 | 14688 | 15264 |
| 30 | 8760 | 9528 | 10296 | 11448 | 12216 | 12960 | 13536 | 14688 | 15264 | 15840 |
| 31 | 9144 | 10296 | 11064 | 11832 | 12576 | 13536 | 14688 | 15264 | 16416 | 16992 |
| 32 | 9912 | 10680 | 11448 | 12216 | 13536 | 14112 | 15264 | 15840 | 16992 | 17568 |

| $I_{TBS}$ | 21 | 22 | 23 | 24 | 25 | 26 | 27 | 28 | 29 | 30 |
|---|---|---|---|---|---|---|---|---|---|---|
| 27 | 14112 | 14688 | 15264 | 15840 | 16416 | 16992 | 17568 | 18336 | 19080 | 19848 |
| 28 | 14688 | 15840 | 16416 | 16992 | 17568 | 18336 | 19080 | 19848 | 20616 | 21384 |
| 29 | 15840 | 16992 | 17568 | 18336 | 19080 | 19848 | 20616 | 21384 | 22152 | 22920 |
| 30 | 16992 | 17568 | 18336 | 19080 | 19848 | 20616 | 22152 | 22920 | 23688 | 24496 |
| 31 | 17568 | 18336 | 19848 | 20616 | 21384 | 22152 | 22920 | 23688 | 24496 | 25456 |
| 32 | 18336 | 19848 | 20616 | 21384 | 22152 | 22920 | 23688 | 24496 | 25456 | 26416 |

*FIG. 18A*

| $I_{TBS}$ | \multicolumn{10}{c|}{$N_{PRB}$} |
|---|---|---|---|---|---|---|---|---|---|---|
|  | 31 | 32 | 33 | 34 | 35 | 36 | 37 | 38 | 39 | 40 |
| 27 | 20616 | 21384 | 22152 | 22920 | 22920 | 23688 | 24496 | 25456 | 25456 | 26416 |
| 28 | 22152 | 22920 | 23688 | 24496 | 24496 | 25456 | 26416 | 27376 | 27376 | 28336 |
| 29 | 23688 | 24496 | 25456 | 25456 | 26416 | 27376 | 28336 | 29296 | 29296 | 30576 |
| 30 | 25456 | 25456 | 26416 | 27376 | 28336 | 29296 | 29296 | 30576 | 31704 | 31704 |
| 31 | 26416 | 27376 | 28336 | 29296 | 29296 | 30576 | 31704 | 32856 | 32856 | 34008 |
| 32 | 27376 | 28336 | 29296 | 30576 | 30576 | 31704 | 32856 | 34008 | 34008 | 35160 |

| $I_{TBS}$ | \multicolumn{10}{c|}{$N_{PRB}$} |
|---|---|---|---|---|---|---|---|---|---|---|
|  | 41 | 42 | 43 | 44 | 45 | 46 | 47 | 48 | 49 | 50 |
| 27 | 27376 | 27376 | 28336 | 29296 | 29296 | 30576 | 31704 | 31704 | 32856 | 32856 |
| 28 | 29296 | 30576 | 30576 | 31704 | 31704 | 32856 | 34008 | 34008 | 35160 | 35160 |
| 29 | 31704 | 31704 | 32856 | 34008 | 34008 | 35160 | 35160 | 36696 | 37888 | 37888 |
| 30 | 32856 | 34008 | 35160 | 35160 | 36696 | 36696 | 37888 | 39232 | 39232 | 40576 |
| 31 | 35160 | 35160 | 36696 | 37888 | 37888 | 39232 | 40576 | 40576 | 42368 | 42368 |
| 32 | 36696 | 36696 | 37888 | 39232 | 39232 | 40576 | 42368 | 42368 | 43816 | 43816 |

| $I_{TBS}$ | \multicolumn{10}{c|}{$N_{PRB}$} |
|---|---|---|---|---|---|---|---|---|---|---|
|  | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |
| 28 | 36696 | 36696 | 37888 | 37888 | 39232 | 40576 | 40576 | 40576 | 42368 | 42368 |
| 29 | 39232 | 39232 | 40576 | 40576 | 42368 | 42368 | 43816 | 43816 | 45352 | 45352 |
| 30 | 40576 | 42368 | 42368 | 43816 | 43816 | 45352 | 45352 | 46888 | 46888 | 48936 |
| 31 | 43816 | 43816 | 45352 | 45352 | 46888 | 46888 | 48936 | 48936 | 51024 | 51024 |
| 32 | 45352 | 45352 | 46888 | 46888 | 48936 | 48936 | 51024 | 51024 | 52752 | 52752 |

FIG. 18B

| $I_{TBS}$ | \multicolumn{10}{c|}{$N_{PRB}$} |
|---|---|---|---|---|---|---|---|---|---|---|
| | 61 | 62 | 63 | 64 | 65 | 66 | 67 | 68 | 69 | 70 |
| 27 | 40576 | 40576 | 42368 | 42368 | 43816 | 43816 | 43816 | 45352 | 45352 | 46888 |
| 28 | 43816 | 43816 | 45352 | 45352 | 46888 | 46888 | 46888 | 48936 | 48936 | 48936 |
| 29 | 46888 | 46888 | 48936 | 48936 | 48936 | 51024 | 51024 | 51024 | 52752 | 52752 |
| 30 | 48936 | 51024 | 51024 | 51024 | 52752 | 52752 | 55056 | 55056 | 55056 | 57336 |
| 31 | 51024 | 52752 | 52752 | 55056 | 55056 | 55056 | 57336 | 57336 | 59256 | 59256 |
| 32 | 55056 | 55056 | 55056 | 57336 | 57336 | 59256 | 59256 | 59256 | 61664 | 61664 |

| $I_{TBS}$ | \multicolumn{10}{c|}{$N_{PRB}$} |
|---|---|---|---|---|---|---|---|---|---|---|
| | 71 | 72 | 73 | 74 | 75 | 76 | 77 | 78 | 79 | 80 |
| 27 | 46888 | 46888 | 48936 | 48936 | 48936 | 51024 | 51024 | 51024 | 52752 | 52752 |
| 28 | 51024 | 51024 | 52752 | 52752 | 52752 | 55056 | 55056 | 55056 | 57336 | 57336 |
| 29 | 55056 | 55056 | 55056 | 57336 | 57336 | 57336 | 59256 | 59256 | 59256 | 61664 |
| 30 | 57336 | 57336 | 59256 | 59256 | 61664 | 61664 | 61664 | 63776 | 63776 | 63776 |
| 31 | 59256 | 61664 | 61664 | 63776 | 63776 | 63776 | 66592 | 66592 | 66592 | 68808 |
| 32 | 63776 | 63776 | 63776 | 66592 | 66592 | 66592 | 68808 | 68808 | 71112 | 71112 |

| $I_{TBS}$ | \multicolumn{10}{c|}{$N_{PRB}$} |
|---|---|---|---|---|---|---|---|---|---|---|
| | 81 | 82 | 83 | 84 | 85 | 86 | 87 | 88 | 89 | 90 |
| 27 | 52752 | 55056 | 55056 | 55056 | 57336 | 57336 | 57336 | 59256 | 59256 | 59256 |
| 28 | 57336 | 59256 | 59256 | 59256 | 61664 | 61664 | 61664 | 63776 | 63776 | 63776 |
| 29 | 61664 | 61664 | 63776 | 63776 | 63776 | 66592 | 66592 | 66592 | 68808 | 68808 |
| 30 | 66592 | 66592 | 66592 | 68808 | 68808 | 68808 | 71112 | 71112 | 71112 | 73712 |
| 31 | 68808 | 68808 | 71112 | 71112 | 71112 | 73712 | 73712 | 75376 | 75376 | 76208 |
| 32 | 71112 | 73712 | 73712 | 73712 | 75376 | 76208 | 76208 | 78704 | 78704 | 78704 |

*FIG. 18C*

| $I_{TBS}$ | 91 | 92 | 93 | 94 | 95 | 96 | $N_{PRB}$ 97 | 98 | 99 | 100 |
|---|---|---|---|---|---|---|---|---|---|---|
| 27 | 59256 | 61664 | 61664 | 61664 | 63776 | 63776 | 63776 | 63776 | 66592 | 66592 |
| 28 | 63776 | 66592 | 66592 | 66592 | 68808 | 68808 | 68808 | 71112 | 71112 | 71112 |
| 29 | 68808 | 71112 | 71112 | 71112 | 73712 | 73712 | 73712 | 75376 | 75376 | 76208 |
| 30 | 73712 | 73712 | 75376 | 76208 | 76208 | 78704 | 78704 | 78704 | 78704 | 81176 |
| 31 | 76208 | 78704 | 78704 | 78704 | 81176 | 81176 | 81176 | 84760 | 84760 | 84760 |
| 32 | 81176 | 81176 | 81176 | 84760 | 84760 | 84760 | 84760 | 87936 | 87936 | 87936 |

| $I_{TBS}$ | 101 | 102 | 103 | 104 | 105 | 106 | $N_{PRB}$ 107 | 108 | 109 | 110 |
|---|---|---|---|---|---|---|---|---|---|---|
| 27 | 66592 | 66592 | 68808 | 68808 | 68808 | 71112 | 71112 | 71112 | 71112 | 73712 |
| 28 | 71112 | 73712 | 73712 | 73712 | 75376 | 75376 | 76208 | 76208 | 78704 | 78704 |
| 29 | 76208 | 78704 | 78704 | 78704 | 81176 | 81176 | 81176 | 81176 | 84760 | 84760 |
| 30 | 81176 | 81176 | 84760 | 84760 | 84760 | 84760 | 87936 | 87936 | 87936 | 87936 |
| 31 | 84760 | 87936 | 87936 | 87936 | 87936 | 90816 | 90816 | 90816 | 93800 | 93800 |
| 32 | 90816 | 90816 | 90816 | 90816 | 93800 | 93800 | 93800 | 93800 | 97896 | 97896 |

*FIG. 18D*

| TBS_L1 | TBS_L2 |
|---|---|
| 76208 | 152976 |
| 78704 | 157432 |
| 81176 | 161760 |
| 84760 | 169544 |
| 87936 | 175600 |
| 90816 | 181656 |
| 93800 | 187712 |
| 97896 | 195816 |

*FIG. 20*

| TBS_L1 | TBS_L3 |
|---|---|
| 76208 | 230104 |
| 78704 | 236160 |
| 81176 | 245648 |
| 84760 | 254328 |
| 87936 | 266440 |
| 90816 | 275376 |
| 93800 | 284608 |
| 97896 | 293736 |

*FIG. 21*

| TBS_L1 | TBS_L4 |
|---|---|
| 76208 | 305976 |
| 78704 | 314888 |
| 81176 | 327000 |
| 84760 | 339112 |
| 87936 | 354936 |
| 90816 | 363336 |
| 93800 | 375448 |
| 97896 | 391656 |

*FIG. 22*

TBS for $N_{PRB} > 100$

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 27 | 66592 | 66592 | 68808 | 68808 | 68808 | 71112 | 71112 | 71112 | 71112 | 73712 |
| 28 | 71112 | 73712 | 73712 | 73712 | 75376 | 75376 | 76208 | 76208 | 78704 | 78704 |
| 29 | 76208 | 78704 | 78704 | 78704 | 81176 | 81176 | 81176 | 81176 | 84760 | 84760 |
| 30 | 81176 | 81176 | 84760 | 84760 | 84760 | 84760 | 87936 | 87936 | 87936 | 87936 |
| 31 | 84760 | 87936 | 87936 | 87936 | 87936 | 87936 | 87936 | 87936 | 87936 | 87936 |
| 32 | 87936 | 87936 | 87936 | 87936 | 87936 | 87936 | 87936 | 87936 | 87936 | 87936 |

*FIG. 23*

| TBS_L1 | TBS_L2 |
|---|---|
| 76208 | 152976 |
| 78704 | 157432 |
| 81176 | 161760 |
| 84760 | 169544 |
| 87936 | 175600 |

*FIG. 24*

| TBS_L1 | TBS_L3 |
|---|---|
| 76208 | 230104 |
| 78704 | 236160 |
| 81176 | 245648 |
| 84760 | 254328 |
| 87936 | 266440 |

*FIG. 25*

| TBS_L1 | TBS_L4 |
|---|---|
| 76208 | 305976 |
| 78704 | 314888 |
| 81176 | 327000 |
| 84760 | 339112 |
| 87936 | 354936 |

*FIG. 26*

TBS for $N_{PRB} > 90$

| $I_{TBS}$ | 91 | 92 | 93 | 94 | 95 | 96 | 97 | 98 | 99 | 100 |
|---|---|---|---|---|---|---|---|---|---|---|
| 27 | 59256 | 61664 | 61664 | 61664 | 63776 | 63776 | 63776 | 63776 | 66592 | 66592 |
| 28 | 63776 | 66592 | 66592 | 66592 | 68808 | 68808 | 68808 | 71112 | 71112 | 71112 |
| 29 | 68808 | 71112 | 71112 | 71112 | 73712 | 73712 | 73712 | 75376 | 75376 | 76208 |
| 30 | 73712 | 73712 | 75376 | 76208 | 76208 | 78704 | 78704 | 78704 | 78704 | 81176 |
| 31 | 76208 | 78704 | 78704 | 78704 | 81176 | 81176 | 81176 | 84760 | 84760 | 84760 |
| 32 | 81176 | 81176 | 81176 | 84760 | 84760 | 84760 | 84760 | 87936 | 87936 | 88896 |

| $I_{TBS}$ | 101 | 102 | 103 | 104 | 105 | 106 | 107 | 108 | 109 | 110 |
|---|---|---|---|---|---|---|---|---|---|---|
| 27 | 66592 | 66592 | 68808 | 68808 | 68808 | 71112 | 71112 | 71112 | 71112 | 73712 |
| 28 | 71112 | 73712 | 73712 | 73712 | 75376 | 75376 | 76208 | 76208 | 78704 | 78704 |
| 29 | 76208 | 78704 | 78704 | 78704 | 81176 | 81176 | 81176 | 81176 | 84760 | 84760 |
| 30 | 81176 | 81176 | 84760 | 84760 | 84760 | 84760 | 87936 | 87936 | 87936 | 87936 |
| 31 | 84760 | 87936 | 87936 | 87936 | 87936 | 88896 | 88896 | 88896 | 88896 | 88896 |
| 32 | 88896 | 88896 | 88896 | 88896 | 88896 | 88896 | 88896 | 88896 | 88896 | 88896 |

*FIG. 27*

| TBS_L1 | TBS_L2 |
|---|---|
| 76208 | 152976 |
| 78704 | 157432 |
| 81176 | 161760 |
| 84760 | 169544 |
| 87936 | 175600 |
| 88896 | 177816 |

*FIG. 28*

| TBS_L1 | TBS_L3 |
|---|---|
| 76208 | 230104 |
| 78704 | 236160 |
| 81176 | 245648 |
| 84760 | 254328 |
| 87936 | 266440 |
| 88896 | 266440 |

*FIG. 29*

| TBS_L1 | TBS_L4 |
|---|---|
| 76208 | 305976 |
| 78704 | 314888 |
| 81176 | 327000 |
| 84760 | 339112 |
| 87936 | 354936 |
| 88896 | 357280 |

*FIG. 30*

SYSTEMS AND METHODS UTILIZING AN EFFICIENT TBS TABLE DESIGN FOR 256QAM IN A CELLULAR COMMUNICATIONS NETWORK

RELATED APPLICATIONS

This application claims the benefit of provisional patent application Ser. No. 61/933,343, filed Jan. 30, 2014, the disclosure of which is hereby incorporated herein by reference in its entirety.

FIELD OF THE DISCLOSURE

The present disclosure relates to a cellular communications network and, in particular, to the use of an efficient Transport Block Size (TBS) table design for 256 Quadrature Amplitude Modulation (QAM) in a cellular communications network.

BACKGROUND

Long Term Evolution (LTE) wireless communication technology uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of ten milliseconds (ms), each radio frame consisting of ten equally-sized subframes of length $T_{SUBFRAME}=1$ ms, as illustrated in FIG. 2.

Furthermore, resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of Virtual Resource Blocks (VRBs) and Physical Resource Blocks (PRBs) has been introduced in LTE. The actual resource allocation to a User Equipment (UE) is made in terms of VRB pairs. There are two types of resource allocations, localized and distributed. In the localized resource allocation, a VRB pair is directly mapped to a PRB pair, hence two consecutive and localized VRBs are also placed as consecutive PRBs in the frequency domain. On the other hand, the distributed VRBs are not mapped to consecutive PRBs in the frequency domain, thereby providing frequency diversity for a data channel transmitted using these distributed VRBs.

Downlink transmissions are dynamically scheduled. Specifically, in each downlink subframe, the base station transmits Downlink Control Information (DCI) that indicates the UEs to which data is transmitted in the current subframe and upon which resource blocks the data is transmitted to those UEs in the current downlink subframe. This control signaling is typically transmitted in the first 1, 2, 3, or 4 OFDM symbols in each subframe, and the number n=1, 2, 3, or 4 is known as the Control Format Indicator (CFI). The downlink subframe also contains common reference symbols, which are known to the receiver and used for coherent demodulation of, e.g., the control information. A downlink subframe with CFI=3 OFDM symbols as control is illustrated in FIG.

3. From LTE Release 11 onwards, the above described resource assignments can also be scheduled on the Enhanced Physical Downlink Control Channel (EPDCCH). For Release 8 to Release 10, only the Physical Downlink Control Channel (PDCCH) is available.

Current LTE networks (i.e., LTE Releases up to Release 11) support three modulation schemes: Quadrature Phase-Shift Keying (QPSK), 16 Quadrature Amplitude Modulation (QAM), and 64QAM. However, next generation and future generation LTE networks desire to support higher order modulation schemes (e.g., 256QAM). Supporting these higher order modulation schemes can significantly increase the implementation complexity and cost both of the LTE network as well as the UEs. Thus, there is a need for systems and methods for supporting, e.g., 256QAM in an LTE network in a manner that is efficient in terms of complexity and cost of implementation.

SUMMARY

Systems and methods relating to the use of a Transport Block Size (TBS) table that supports 256 Quadrature Amplitude Modulation (QAM) in a cellular communications network are disclosed. In particular, embodiments of a wireless device and a method of operation thereof are disclosed. In some embodiments, the wireless device receives Downlink Control Information (DCI) transmitted by the radio access node, where the DCI comprises a Modulation and Coding Scheme (MCS) index indicative of a MCS used for a downlink transmission from the radio access node to the wireless device. The wireless device determines a TBS index based on the MCS index and predefined relationships between TBS index values and MCS index values. The wireless device determines a TBS for the downlink transmission from the radio access node to the wireless device based on the TBS index and a number of resource blocks ($N_{RB}$) scheduled for the downlink transmission using a TBS table that supports both a first set of modulation schemes and 256QAM. The TBS table comprises: (a) a first set of rows from a preexisting TBS table that supports the first set of modulation schemes but not 256QAM and (b) a second set of rows added to the preexisting TBS table to provide the TBS table, where the second set of rows substantially reuse TBS values from the first set of rows. The wireless device receives the downlink transmission from the radio access node according to the DCI and the TBS determined for the downlink transmission.

In some embodiments, the downlink transmission uses L spatial multiplexing layers, where L>1, and the wireless device determines the TBS for the downlink transmission based on the TBS index using a predefined mapping of at least some of the TBS values in the TBS table from values for one spatial multiplexing layer to values for L spatial multiplexing layers.

In some embodiments, the second set of rows in the TBS table comprise N new TBS values that are not included in the first set of rows from the preexisting TBS table, where N<<M and M is a total number of table entries in the second set of rows.

In some embodiments, the downlink transmission uses L spatial multiplexing layers, where L>1, and determining the TBS for the downlink transmission based on the TBS index further uses a predefined mapping of the N new TBS values in the second set of rows in the TBS table from values for one spatial multiplexing layer to values for L spatial multiplexing layers.

In some embodiments, the cellular communications network is a 3$^{rd}$ Generation Partnership Project (3GPP) Long Term Evolution (LTE) network, the first set of modulation schemes consists of Quadrature Phase-Shift Keying (QPSK), 16QAM, and 64QAM. Further, in some embodiments, the number N of new TBS values is equal to eight, and the eight new TBS values are: 76,208, 78,704, 81,176, 84,760, 87,936, 90,816, 93,800, and 97,896. Further, in some embodiments, the downlink transmission uses two spatial multiplexing layers, and the wireless device determines the TBS for the downlink transmission based on the TBS index using a predefined mapping of the eight new TBS values in the second set of rows in the TBS table from values for one spatial multiplexing layer to values for two spatial multiplexing layers as follows:

- 76,208 is mapped to 152,976 for two spatial multiplexing layers;
- 78,704 is mapped to 157,432 for two spatial multiplexing layers;
- 81,176 is mapped to 161,760 for two spatial multiplexing layers;
- 84,760 is mapped to 169,544 for two spatial multiplexing layers;
- 87,936 is mapped to 175,600 for two spatial multiplexing layers;
- 90,816 is mapped to 181,656 for two spatial multiplexing layers;
- 93,800 is mapped to 187,712 for two spatial multiplexing layers; and
- 97,896 is mapped to 195,816 for two spatial multiplexing layers.

In other embodiments, the downlink transmission uses three spatial multiplexing layers, and the wireless device determines the TBS for the downlink transmission based on the TBS index using a predefined mapping of the eight new TBS values in the second set of rows in the TBS table from values for one spatial multiplexing layer to values for three spatial multiplexing layers as follows:

- 76,208 is mapped to 230,104 for three spatial multiplexing layers;
- 78,704 is mapped to 236,160 for three spatial multiplexing layers;
- 81,176 is mapped to 245,648 for three spatial multiplexing layers;
- 84,760 is mapped to 254,328 for three spatial multiplexing layers;
- 87,936 is mapped to 266,440 for three spatial multiplexing layers;
- 90,816 is mapped to 275,376 for three spatial multiplexing layers;
- 93,800 is mapped to 284,608 for three spatial multiplexing layers; and
- 97,896 is mapped to 293,736 for three spatial multiplexing layers.

In other embodiments, the downlink transmission uses four spatial multiplexing layers, and the wireless device determines the TBS for the downlink transmission based on the TBS index using a predefined mapping of the eight new TBS values in the second set of rows in the TBS table from values for one spatial multiplexing layer to values for four spatial multiplexing layers as follows:

- 76,208 is mapped to 305,976 for four spatial multiplexing layers;
- 78,704 is mapped to 314,888 for four spatial multiplexing layers;
- 81,176 is mapped to 327,000 for four spatial multiplexing layers;
- 84,760 is mapped to 339,112 for four spatial multiplexing layers;
- 87,936 is mapped to 354,936 for four spatial multiplexing layers;
- 90,816 is mapped to 363,336 for four spatial multiplexing layers;
- 93,800 is mapped to 375,448 for four spatial multiplexing layers; and
- 97,896 is mapped to 391,656 for four spatial multiplexing layers.

In some embodiments, the TBS table is such that a maximum TBS value in the TBS table for $N_{RB}$=100 is used as a peak TBS value in the TBS table for $N_{RB}$>100. Further, in some embodiments, the cellular communications network is a 3GPP LTE network, N=5, and the five new TBS values are: 76,208, 78,704, 81,176, 84,760, and 87,936, where 87,936 is the peak TBS value in the TBS table. Further, in some embodiments, the downlink transmission uses two spatial multiplexing layers, and the wireless device determines the TBS for the downlink transmission based on the TBS index using a predefined mapping of the five new TBS values in the second set of rows in the TBS table from values for one spatial multiplexing layer to values for two spatial multiplexing layers as follows:

- 76,208 is mapped to 152,976 for two spatial multiplexing layers;
- 78,704 is mapped to 157,432 for two spatial multiplexing layers;
- 81,176 is mapped to 161,760 for two spatial multiplexing layers;
- 84,760 is mapped to 169,544 for two spatial multiplexing layers; and
- 87,936 is mapped to 175,600 for two spatial multiplexing layers.

In other embodiments, the downlink transmission uses three spatial multiplexing layers, and the wireless device determines the TBS for the downlink transmission based on the TBS index using a predefined mapping of the eight new TBS values in the second set of rows in the TBS table from values for one spatial multiplexing layer to values for three spatial multiplexing layers as follows:

- 76,208 is mapped to 230,104 for three spatial multiplexing layers;
- 78,704 is mapped to 236,160 for three spatial multiplexing layers;
- 81,176 is mapped to 245,648 for three spatial multiplexing layers;
- 84,760 is mapped to 254,328 for three spatial multiplexing layers; and
- 87,936 is mapped to 266,440 for three spatial multiplexing layers.

In other embodiments, the downlink transmission uses four spatial multiplexing layers, and the wireless device determines the TBS for the downlink transmission based on the TBS index using a predefined mapping of the eight new TBS values in the second set of rows in the TBS table from values for one spatial multiplexing layer to values for four spatial multiplexing layers as follows:

- 76,208 is mapped to 305,976 for four spatial multiplexing layers;
- 78,704 is mapped to 314,888 for four spatial multiplexing layers;
- 81,176 is mapped to 327,000 for four spatial multiplexing layers;
- 84,760 is mapped to 339,112 for four spatial multiplexing layers; and 87,936 is mapped to 354,936 for four spatial multiplexing layers.

In some embodiments, the peak TBS value is 88,896. Further, in some embodiments, the cellular communications network is a 3GPP LTE network, N=6, and the six new TBS values are: 76,208, 78,704, 81,176, 84,760, 87,936, and 88,896. Still further, in some embodiments, the downlink transmission uses two spatial multiplexing layers, and the wireless device determines the TBS for the downlink transmission based on the TBS index using a predefined mapping of the six new TBS values in the second set of rows in the TBS table from values for one spatial multiplexing layer to values for two spatial multiplexing layers as follows:

76,208 is mapped to 152,976 for two spatial multiplexing layers;
78,704 is mapped to 157,432 for two spatial multiplexing layers;
81,176 is mapped to 161,760 for two spatial multiplexing layers;
84,760 is mapped to 169,544 for two spatial multiplexing layers;
87,936 is mapped to 175,600 for two spatial multiplexing layers; and
88,896 is mapped to 177,816 for two spatial multiplexing layers.

In other embodiments, the downlink transmission uses three spatial multiplexing layers, and the wireless device determines the TBS for the downlink transmission based on the TBS index using a predefined mapping of the six new TBS values in the second set of rows in the TBS table from values for one spatial multiplexing layer to values for three spatial multiplexing layers as follows:

76,208 is mapped to 230,104 for three spatial multiplexing layers;
78,704 is mapped to 236,160 for three spatial multiplexing layers;
81,176 is mapped to 245,648 for three spatial multiplexing layers;
84,760 is mapped to 254,328 for three spatial multiplexing layers;
87,936 is mapped to 266,440 for three spatial multiplexing layers; and
88,896 is mapped to 266,440 for three spatial multiplexing layers.

In other embodiments, the downlink transmission uses four spatial multiplexing layers, and the wireless device determines the TBS for the downlink transmission based on the TBS index using a predefined mapping of the six new TBS values in the second set of rows in the TBS table from values for one spatial multiplexing layer to values for four spatial multiplexing layers as follows:

76,208 is mapped to 305,976 for four spatial multiplexing layers;
78,704 is mapped to 314,888 for four spatial multiplexing layers;
81,176 is mapped to 327,000 for four spatial multiplexing layers;
84,760 is mapped to 339,112 for four spatial multiplexing layers;
87,936 is mapped to 354,936 for four spatial multiplexing layers; and
88,896 is mapped to 357,280 for four spatial multiplexing layers.

Embodiments of a method of operation of a wireless device are also disclosed.

Embodiments of a radio access node and a method of operation thereof are also disclosed. In some embodiments, a radio access node in a cellular communications network operates to determine a MCS for a downlink transmission from the radio access node to the wireless device, where the MCS has a corresponding MCS index. The radio access node further operates to determine a TBS index based on the MCS index and predefined relationships between TBS index values and MCS index values, and determine a TBS for the downlink transmission from the radio access node to the wireless device based on the TBS index and a number of resource blocks ($N_{RB}$) scheduled for the downlink transmission using a TBS table that supports both a first set of modulation schemes and 256QAM. The TBS table comprises: (a) a first set of rows from a preexisting TBS table that supports the first set of modulation schemes but not 256QAM and (b) a second set of rows added to the preexisting TBS table to provide the TBS table, where the second set of rows substantially reuse TBS values from the first set of rows. The radio access node further operates to transmit the downlink transmission from the radio access node to the wireless device using the TBS determined for the downlink transmission.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5 illustrates a conventional 3GPP LTE Release 11 Channel Quality Information (CQI) table;

FIG. 6 illustrates a conventional 3GPP LTE Release 11 Modulation and Coding Scheme (MCS) table;

FIGS. 7A through 7K illustrate a conventional 3GPP LTE Release 11 Transport Block Size (TBS) table;

FIG. 8 illustrates special efficiencies utilized for selection of the conventional TBS table of FIGS. 7A through 7K;

FIG. 9 illustrates a conventional one-layer to two-layer mapping for TBS values in the conventional TBS table of FIGS. 7A through 7K;

FIG. 10 illustrates a conventional one-layer to three-layer mapping for TBS values in the conventional TBS table of FIGS. 7A through 7K;

FIG. 11 illustrates a conventional one-layer to four-layer mapping for TBS values in the conventional TBS table of FIGS. 7A through 7K;

FIGS. 18A through 18D illustrate a new set of rows that are added to a preexisting TBS table to provide a new TBS table that supports 256QAM according to some embodiments of the present disclosure;

FIG. 20 illustrates a one-layer to two-layer mapping for the new TBS values added in the new TBS table of FIGS. 18A through 18D according to some embodiments of the present disclosure;

FIG. 21 illustrates a one-layer to three-layer mapping for the new TBS values added in the new TBS table of FIGS. 18A through 18D according to some embodiments of the present disclosure;

FIG. 22 illustrates a one-layer to four-layer mapping for the new TBS values added in the new TBS table of FIGS. 18A through 18D according to some embodiments of the present disclosure;

FIG. 23 illustrates a new set of rows that are added to a preexisting TBS table to provide a new TBS table that supports 256QAM according to some other embodiments of the present disclosure;

FIG. 24 illustrates a one-layer to two-layer mapping for the new TBS values added in the new TBS table of FIG. 23 according to some embodiments of the present disclosure;

FIG. 25 illustrates a one-layer to three-layer mapping for the new TBS values added in the new TBS table of FIG. 23 according to some embodiments of the present disclosure;

FIG. 26 illustrates a one-layer to four-layer mapping for the new TBS values added in the new TBS table of FIG. 23 according to some embodiments of the present disclosure;

FIG. 27 illustrates a new set of rows that are added to a preexisting TBS table to provide a new TBS table that supports 256QAM according to some other embodiments of the present disclosure;

FIG. 28 illustrates a one-layer to two-layer mapping for the new TBS values added in the new TBS table of FIG. 27 according to some embodiments of the present disclosure;

FIG. 29 illustrates a one-layer to three-layer mapping for the new TBS values added in the new TBS table of FIG. 27 according to some embodiments of the present disclosure;

FIG. 30 illustrates a one-layer to four-layer mapping for the new TBS values added in the new TBS table of FIG. 27 according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
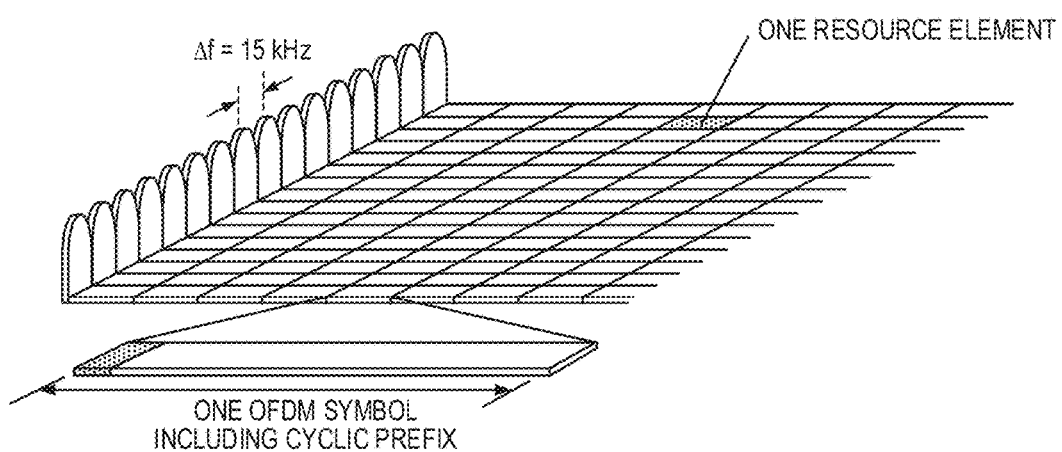
FIG. 1 illustrates a basic $3^{rd}$ Generation Partnership Project (3GPP) Long Term Evolution (LTE) downlink physical resource.
Figure 2:
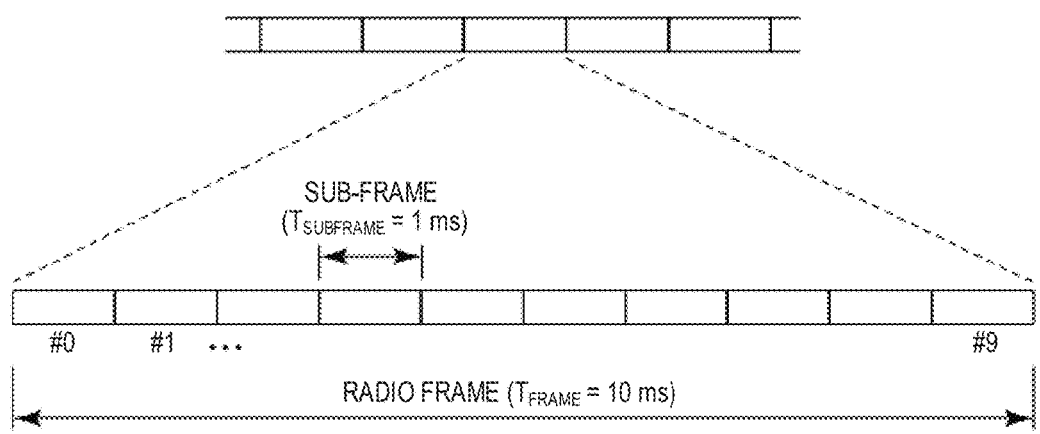
FIG. 2 illustrates a 3GPP LTE downlink radio frame.
Figure 3:
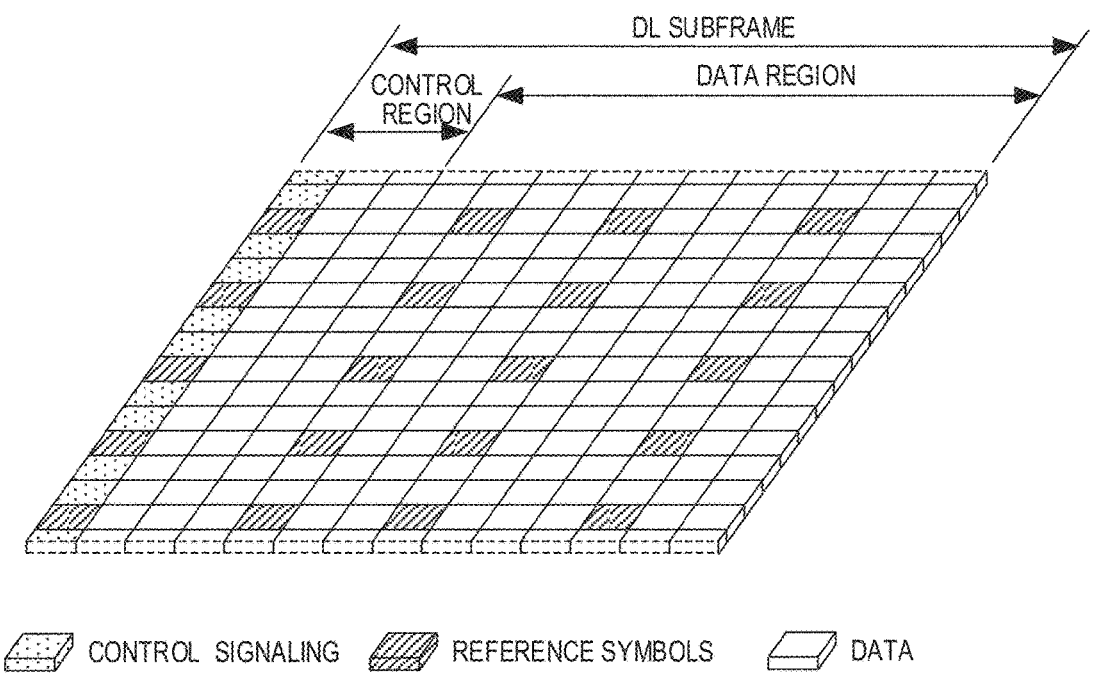
FIG. 3 illustrates a 3GPP LTE downlink subframe.
Figure 4:
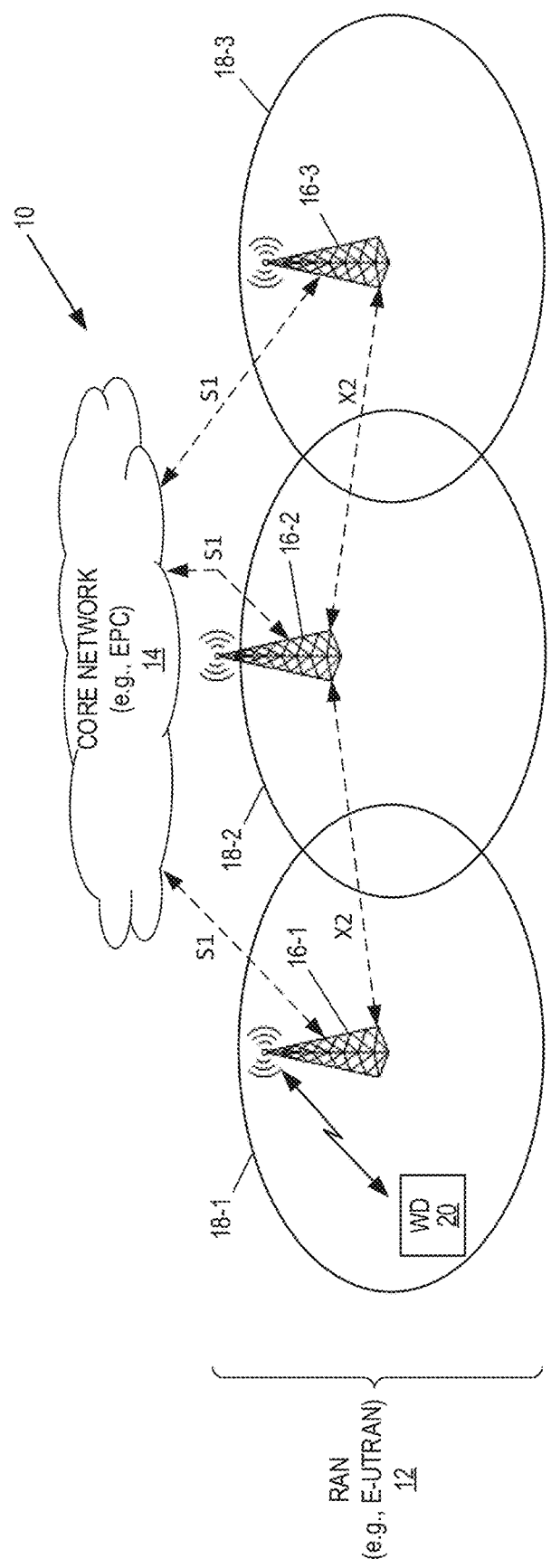
FIG. 4 illustrates a cellular communications network according to some embodiments of the present disclosure.

Systems and methods relating to supporting 256 Quadrature Amplitude Modulation (QAM) in a cellular communications network, and in particular a $3^{rd}$ Generation Partnership Project (3GPP) Long Term Evolution (LTE) network, are disclosed. More specifically, systems and methods for using an efficient Transport Block Size (TBS) table design that supports 256QAM are disclosed. In this regard, FIG. 4 illustrates a cellular communications network 10 according to some embodiments of the present disclosure. In the examples described herein, the cellular communications network 10 is a 3GPP LTE network and, as such, 3GPP terminology is sometimes used. Note, however, that the concepts described herein are not limited to 3GPP LTE. As illustrated, the cellular communications network 10 includes a Radio Access Network (RAN) 12 and a core network 14. In 3GPP, the RAN 12 is referred to as an Enhanced or Evolved Universal Terrestrial Radio Access Network (E-UTRAN), and the core network 14 is referred to as an Enhanced or Evolved Packet Core (EPC). Together, the E-UTRAN and the EPC form an Enhanced or Evolved Packet System (EPS). The RAN 12 includes a number of base stations 16-1 through 16-3 serving or controlling corresponding cells 18-1 through 18-3. The base stations 16-1 through 16-3 and the cells 18-1 through 18-3 are generally referred to herein collectively as base stations 16 and cells 18 and individually as base station 16 and cell 18. In 3GPP, the base stations 16 are referred to as enhanced or evolved Node Bs (eNBs) (e.g., a macro eNB, a low-power eNB (e.g., a Home eNB), or the like). Note that while the base stations 16 are discussed herein, the concepts disclosed herein are also applicable to other types of radio access nodes (e.g., Remote Radio Heads (RRHs)). Wireless devices (e.g., User Equipments (UEs)), such as a wireless device 20, transmit signals to and receive signals from the base stations 16.

As discussed above, LTE releases up to LTE Release 11 only support Quadrature Phase-Shift Keying (QPSK), 16QAM, and 64QAM. As discussed below, the base station 16-1 and the wireless device 20 (as an example) utilize a new TBS table that supports 256QAM to enable downlink transmissions from the RAN 12 to the wireless device 20. This new TBS table supports both a first set of modulation schemes (e.g., QPSK, 16QAM, and 64QAM) and 256QAM. The TBS table includes: (a) a first set of rows from a preexisting TBS table that supports the first set of modulation schemes but not 256QAM (e.g., the TBS table defined in 3GPP LTE Release 11.5) and (b) a second set of rows added to the preexisting table to provide the TBS table, where the second set of rows substantially reuse TBS values from the first set of rows. By substantially reusing TBS values from the first set of rows from the preexisting TBS table, the complexity and cost of implementing the TBS table, and thus 256QAM, is minimized.

Before further describing embodiments of the new TBS table and the embodiments of the new TBS table, a discussion of link adaptation is beneficial. Fast link adaptation to fading channel conditions is adopted in modern wireless communications to enhance system throughput capacity as well as user experience and quality of services. Crucial to the working of fast link adaptation is the timely update of channel conditions that is fed back from the receiver to the transmitter. The feedback can take on several related forms such as Signal-to-Noise ratio (SNR), Signal-to-Interference-and-Noise Ratio (SINR), received signal level (power or strength), supportable data rates, supportable combination of modulation and coding rates, to supportable throughputs. The information may also pertain to the entire frequency band as in Wideband Code Division Multiple Access (W-CDMA) or a specific portion of the frequency band as made possible by systems based on Orthogonal Frequency Division Multiplexing (OFDM) such as the LTE system. A generic term Channel Quality Indicator (CQI) is used herein to refer to any of such feedback messages.

Using the cellular communications network 10 of FIG. 4 as an example and where the cellular communications network 10 is an LTE network, in downlink data operations, the CQI messages are fed back from the wireless devices 20 (which may be mobile devices) to the base stations 16 to assist the base stations 16 on the decision of radio resource allocation. The feedback information can be used to determine transmission scheduling among multiple wireless devices 20, to select suitable transmission schemes (such as the number of transmit antennas to activate), to allocate an appropriate amount of bandwidth, and to form a supportable modulation and coding rate for the intended wireless devices 20 for reception of downlink transmissions, etc. In uplink data operations, the base stations 16 can estimate a channel quality from the demodulation reference symbols or sounding reference symbols transmitted by the wireless devices 20.

A CQI table providing the conventional range of CQI values for a LTE Release 11 network is shown in FIG. 5. Notably, FIG. 5 is substantially reproduced from Table 7.2.3-1 of 3GPP TS 36.213 V11.5.0. The CQI table of FIG. 5 has been specifically designed to support Modulation and Coding Scheme (MCS) adaptation over wideband wireless communication channels. The transition points from a lower-order modulation to a higher-order modulation have been verified with extensive link performance evaluation. These specific transition points between different modulations therefore provide a guideline for optimal system operation.

Based on the CQI reports from, e.g., the wireless device 20, the base station 16-1 can choose the best MCS to transmit data on the Physical Downlink Shared Channel (PDSCH). The MCS information is conveyed to the wireless device 20 as a 5-bit MCS index ($I_{MCS}$) contained in Downlink Control Information (DCI). As shown in FIG. 6, the MCS index ($I_{MCS}$) signals to the wireless device 20 both the modulation ($Q_m$) and a TBS index ($I_{TBS}$) via the predefined relationships between the different values of the MCS index ($I_{MCS}$) and the corresponding modulation ($Q_m$) and TBS index ($I_{TBS}$) values. In conjunction with a total number of allocated resource blocks ($N_{RB}$) for a PDSCH transmission to the wireless device 20, the TBS index ($I_{TBS}$) further determines an exact TBS used in the PDSCH transmission. Notably, the last three MCS index values (29-30) are shown as "reserved" in FIG. 6, and are utilized for Hybrid Automatic Repeat Request (HARQ) retransmissions and, hence, the TBS remains the same as the original transmission.

The specific TBSs for different combinations of TBS index values and $N_{RB}$ values in a conventional LTE network (i.e., Release 11) are listed in a large 27×110 TBS table defined in 3GPP TS 36.213 V11.5.0. Specifically, this conventional TBS table is Table 7.1.7.2.1-1 of 3GPP TS 36.213 V11.5.0. For convenience, this conventional TBS table is reproduced in FIGS. 7A through 7K. The TBSs included in the conventional TBS table are designed to achieve spectral efficiencies matching the CQI reports. More specifically, the TBSs in the conventional TBS table are selected to achieve the spectral efficiencies shown in FIG. 8 when the actual number of available OFDM symbols for PDSCH is 11.

In the conventional TBS table of FIGS. 7A through 7K, the 27×110 TBS table is for one spatial layer (which may also be referred to as a spatial multiplexing layer or a transmission layer) and is populated with 178 unique TBS values. To support multiple spatial layers, 51 additional unique TBS values are defined for one-layer to two-layer, one-layer to three-layer, and one-layer to four-layer TBS translation given in Table 7.1.7.2.2-1, Table 7.1.7.2.4-1, and Table 7.1.7.2.5-1 of 3GPP TS 36.213 V11.5.0, which are reproduced herein as FIGS. 9, 10, and 11, respectively. Thus, in total, there are 229 unique TBS values defined in 3GPP TS 36.213V11.5 (or more generally LTE Release 11).

Figure 12:
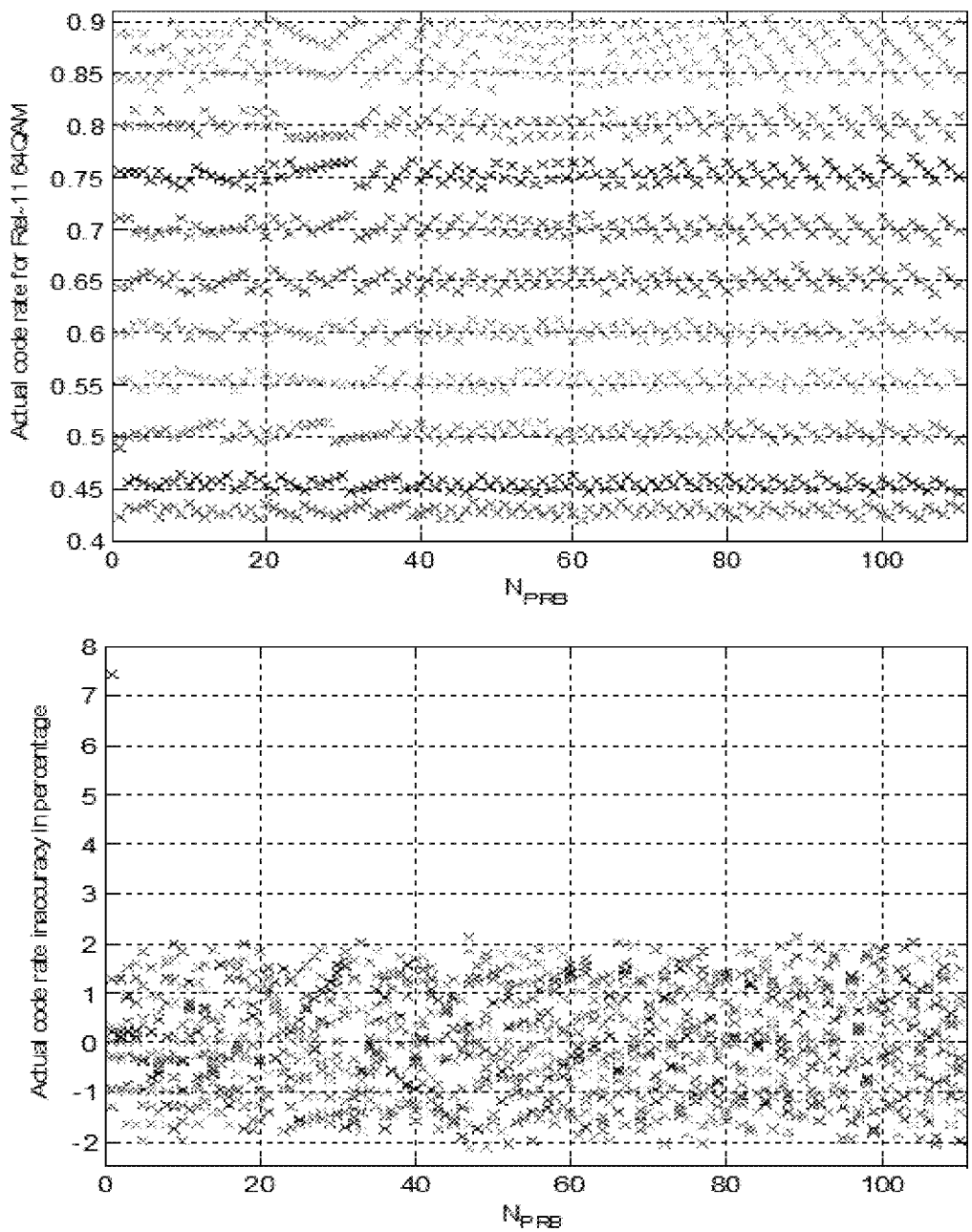
FIG. 12 illustrates a deviation of an actual code rate achieved by the TBS values in the conventional TBS table of FIGS. 7A through 7K for 64 Quadrature Amplitude Modulation (QAM)
Figure 13:
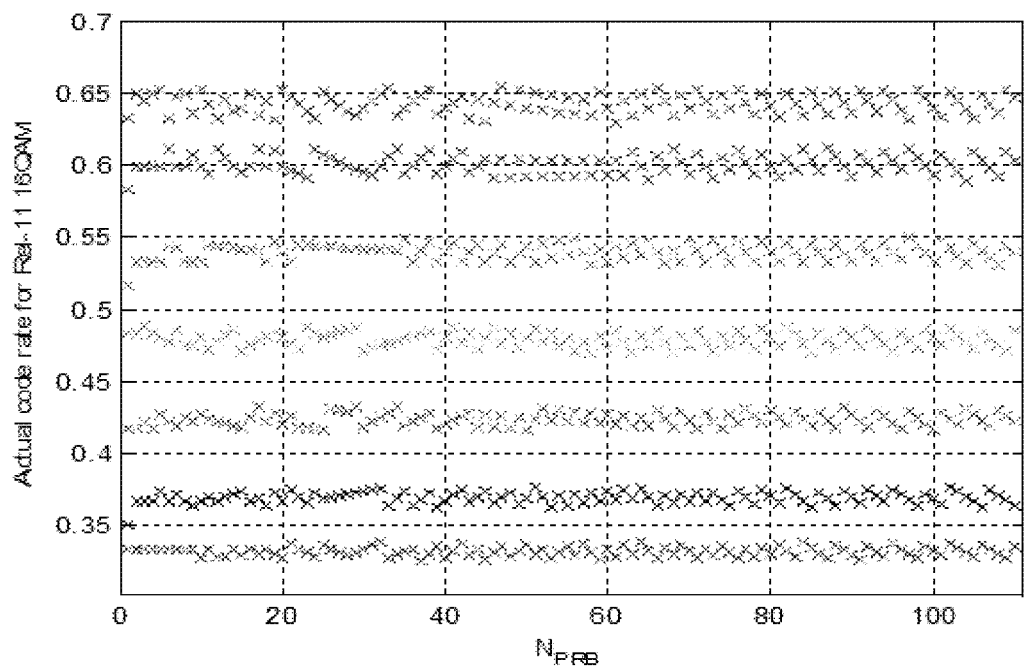
FIG. 13 illustrates a deviation of an actual code rate achieved by the TBS values in the conventional TBS table of FIGS. 7A through 7K for 16QAM.
Figure 13:
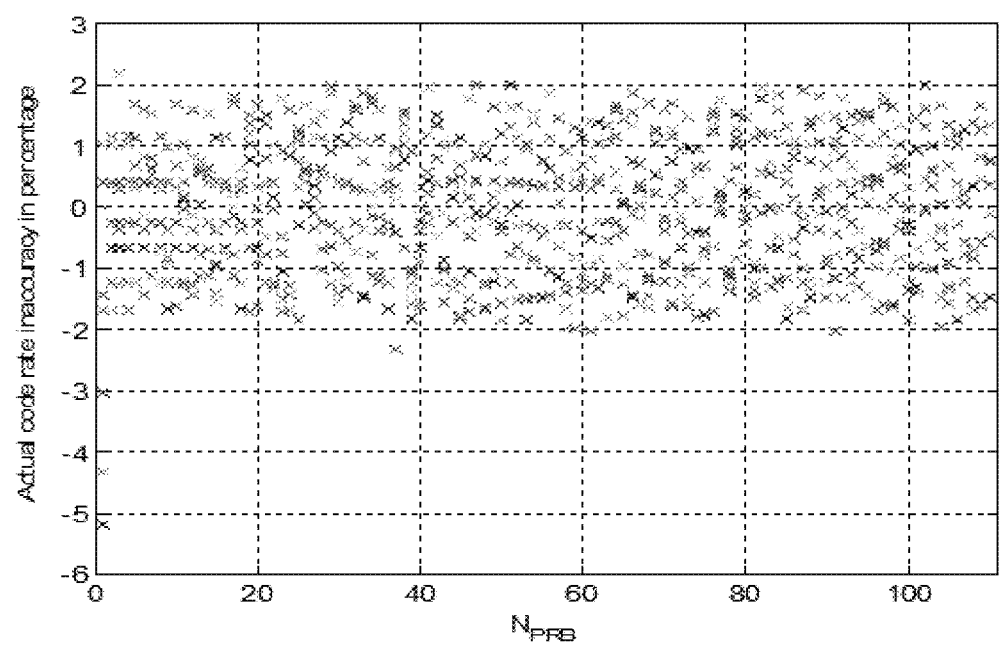
Figure 14:
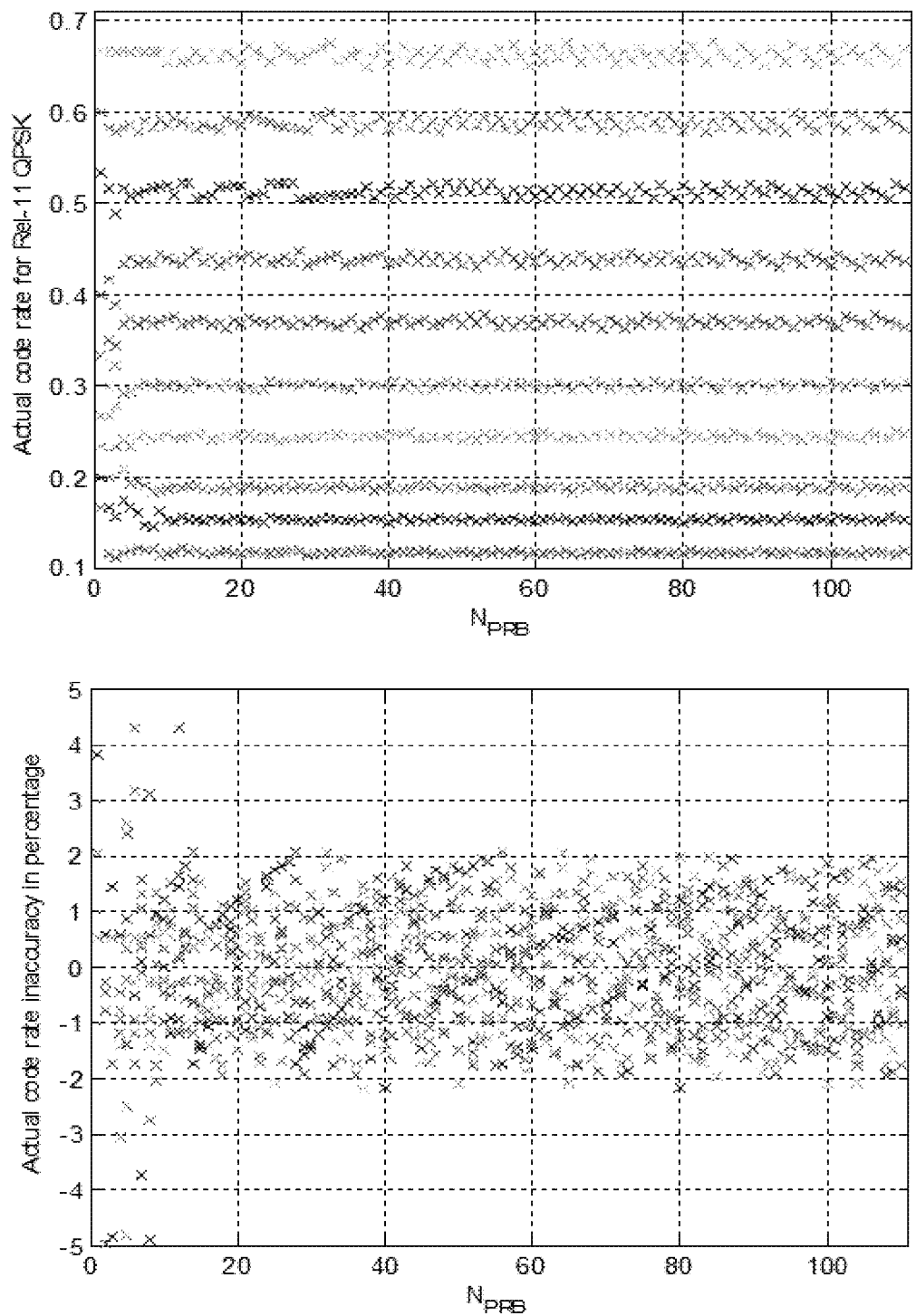
FIG. 14 illustrates a deviation of an actual code rate achieved by the TBS values in the conventional TBS table of FIGS. 7A through 7K for Quadrature Phase-Shift Keying (QPSK)

The reduction of potentially 27×110=2,970 TBS values to only 178 TBS values in the one-layer TBS table (i.e., FIGS. 7A through 7K) is achieved by allowing the actual code rate to deviate from the target code rate by ±2%. This is, for example, shown in FIG. 12 for the 64QAM MCS (17-27), in FIG. 13 for the 16QAM MCS (10-16), and FIG. 14 for the QPSK MCS (0-9), respectively.

Figure 15:
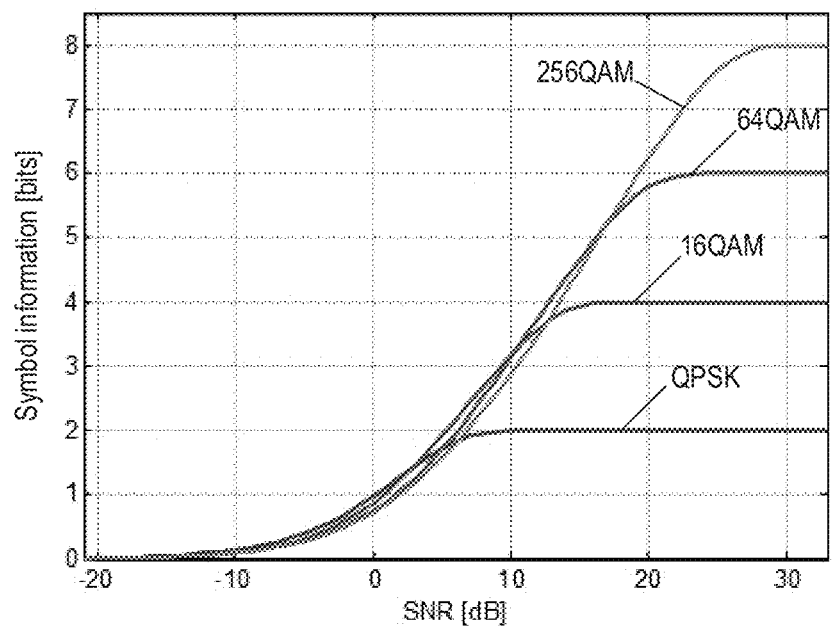
FIG. 15 illustrates an improvement in maximum peak data rate when introducing 256QAM to 3GPP LTE.

As discussed above, in current LTE systems up to Release 11, the set of modulation schemes for both downlink and uplink includes QPSK, 16QAM, and 64QAM, corresponding to 2, 4, and 6 bits per modulation symbol, respectively. In LTE evolution, especially for the scenarios with high SINR, e.g. in small cell environments with wireless devices 20 close to the serving base station 16, a straightforward means to provide a higher data rate with given transmission bandwidth is the use of higher order modulation that allows for more bits of information to be carried per modulation symbol. For example, with the introduction of 256QAM, eight bits can be transmitted per modulation symbol, which can improve the peak data rate maximum by 33% as shown in FIG. 15. It is also noted that 256QAM can only provide gains when the SINR is sufficiently high in certain scenarios. In practice, the performance of 256QAM is highly sensitive to transmitter Error Vector Magnitude (EVM) and receiver impairments. In 3GPP, it has been agreed that 256QAM will be standardized in Release 12. Supporting 256QAM has LTE standards impacts, including the CQI/MCS/TBS table design and UE category handling.

Thus, in order to implement 256QAM in next and future LTE releases (e.g., Release 12 and beyond), the base stations 16 and the wireless devices 20 must support new CQI/MCS/TBS tables that include new entries to cover a higher SINR region for 256QAM. As for TBS table design, one solution is to add new TBS rows based on the new MCS table design so that TBS matches spectral efficiencies in the MCS table, i.e., to match the target code rate and modulation order. This solution may result in a large impact on the LTE standards due to the introduction of a number of new TBSs. Consequently, both the base stations 16 and the wireless devices 20 would need to implement the new TBS table with new TBSs which increase the implementation complexity and cost. Therefore, this solution may not always be desirable. In general, it may be beneficial for the design objective for the new CQI/MCS/TBS tables to support 256QAM while minimizing the impact on the LTE standards and therefore minimizing the impact on the base stations 16 and the wireless devices 20, e.g., in terms of implementation complexity and cost.

Embodiments described herein provide a cost-efficient manner to introduce 256QAM, with respect to TBS table design, in LTE systems. In an exemplary new TBS table, the TBS table includes a first set of rows that are the same as the rows in the Release 11 TBS table (a preexisting TBS table) and a second set of rows that enable 256QAM support. The second set of rows substantially reuses TBS values from the first set of rows from the Release 11 table. In some embodiments, only a number N of new TBS values are added to the 229 TBS values of Release 11. In some embodiments, the number N of new TBS values is much less than the total number of new TBS table entries. In this manner, the new TBS table uses an efficient design and minimizes the LTE standards impact and, therefore, minimizes the implementation complexity and cost of the base stations 16 and the wireless devices 20 in order to support 256QAM.

Figure 16:
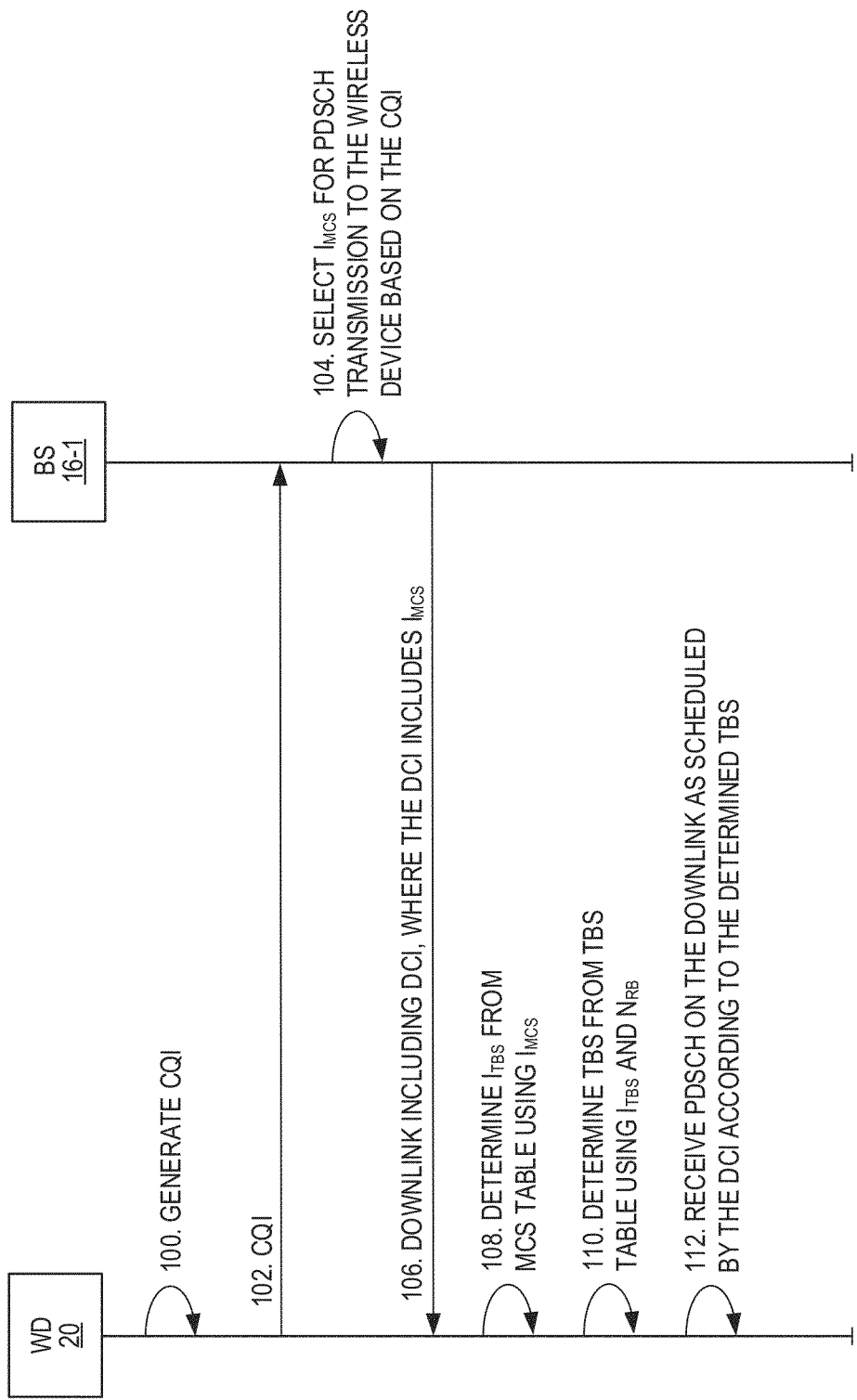
FIG. 16 illustrates the operation of the base station and the wireless device in the cellular communications network of FIG. 4 to utilize a new TBS table that provides support for 256QAM according to some embodiments of the present disclosure.

Before describing embodiments of the new TBS table, a description of the use of the new TBS table by, e.g., the base station 16-1 and the wireless device 20 is beneficial. As illustrated in FIG. 16, in order to enable fast link adaptation for downlink transmissions from the base station 16-1 to the wireless device 20, the wireless device 20 generates CQI (step 100). The wireless device 20 generates the CQI using any suitable technique. The wireless device 20 then sends the CQI to the base station 16-1 (step 102). The base station 16-1 then selects a MCS, and thus an MCS index ($I_{MCS}$), for a PDSCH transmission to the wireless device 20 based on the CQI using any suitable MCS selection technique (step 104).

Notably, once the MCS is selected, the TBS index ($I_{TBS}$) for the appropriate TBS in the new TBS table is known from a predefined relationship (e.g., from a MCS table) between the MCS (and specifically the MCS index ($I_{MCS}$)) and the TBS index ($I_{TBS}$) for the new TBS table. One example of a new MCS table is provided below. However, this is only one example. An example of the new MCS table is shown in FIG. 5. In the lower QPSK region, MCS 0, 3, 6, and 9 are reserved, equivalent to 2 decibel (dB) sampling space. Current MCS 9-26 are unchanged. MCS 27 is modified to be 256QAM, and an extra seven entries for 256QAM are added, of which six new entries contain six new TBS indices 27-32 in the MCS table. The new TBS indices correspond to six new TBS rows with new TBS values (across all possible bandwidths) that are required to attach to the current TBS table. The new MCS table also has 3 reserved entries for re-transmission. With 256QAM introduced, the retransmission procedure may use one of the four modulation schemes. One exemplary offset mechanism is shown in the table. Index 29 indicates that retransmission should use the next higher modulation than original transmission. For example, 16QAM should be used if QPSK was used in the original transmission. Index 30 indicates that retransmission should use the same modulation scheme as in original transmission. Index 31 indicates that retransmission should use the next lower modulation scheme than original transmission. For example, QPSK should be used if 16QAM was used in the original transmission.

TABLE 1

Example of New MCS Table

| MCS | Mod | TBS | Target r × 1024 |
|---|---|---|---|
| 0 | 2 | 0 | 120 |
| 1 | 2 | 3 | 251 |
| 2 | 2 | 6 | 449 |
| 3 | 2 | 9 | 679 |
| 4 | 4 | 9 | 340 |
| 5 | 4 | 10 | 378 |
| 6 | 4 | 11 | 434 |
| 7 | 4 | 12 | 490 |
| 8 | 4 | 13 | 553 |
| 9 | 4 | 14 | 616 |
| 10 | 4 | 15 | 658 |
| 11 | 6 | 15 | 438 |
| 12 | 6 | 16 | 466 |
| 13 | 6 | 17 | 517 |
| 14 | 6 | 18 | 567 |
| 15 | 6 | 19 | 616 |
| 16 | 6 | 20 | 666 |
| 17 | 6 | 21 | 719 |
| 18 | 6 | 22 | 772 |
| 19 | 6 | 23 | 822 |
| 20 | 6 | 24 | 873 |
| 21 | 8 | 24 | 655 |
| 22 | 8 | 27 | 711 |
| 23 | 8 | 28 | 765 |
| 24 | 8 | 29 | 817 |
| 25 | 8 | 30 | 865 |
| 26 | 8 | 31 | 911 |
| 28 | 8 | 32 | 950 |
| 29 | mod↑ | reserved | |
| 30 | same | | |
| 31 | mod↓ | | |

Using the TBS index ($I_{TBS}$) corresponding to the selected MCS as well as the number of resource blocks allocated/scheduled for the PDSCH transmission, the appropriate TBS size for the PDSCH transmission is obtained from the new TBS table.

The base station 16-1 then transmits the downlink including DCI on a Physical Downlink Control Channel (PDCCH) or Enhanced PDCCH (EPDCCH) and a corresponding downlink transmission for the wireless device 20 on the PDSCH (step 106). The wireless device 20 receives the DCI and, using the MCS index ($I_{MCS}$) included in the DCI, determines the appropriate TBS index ($I_{TBS}$) (step 108). The wireless device 20 determines the TBS for the PDSCH transmission from the new TBS table using the TBS index ($I_{TBS}$) determined from the MCS index ($I_{MCS}$) and the number of resource blocks ($N_{RB}$) allocated/scheduled for the PDSCH transmission (step 110). Lastly, the wireless device 20 receives the PDSCH transmission on the downlink as scheduled by the DCI according to the determined TBS (step 112).

Figure 17:
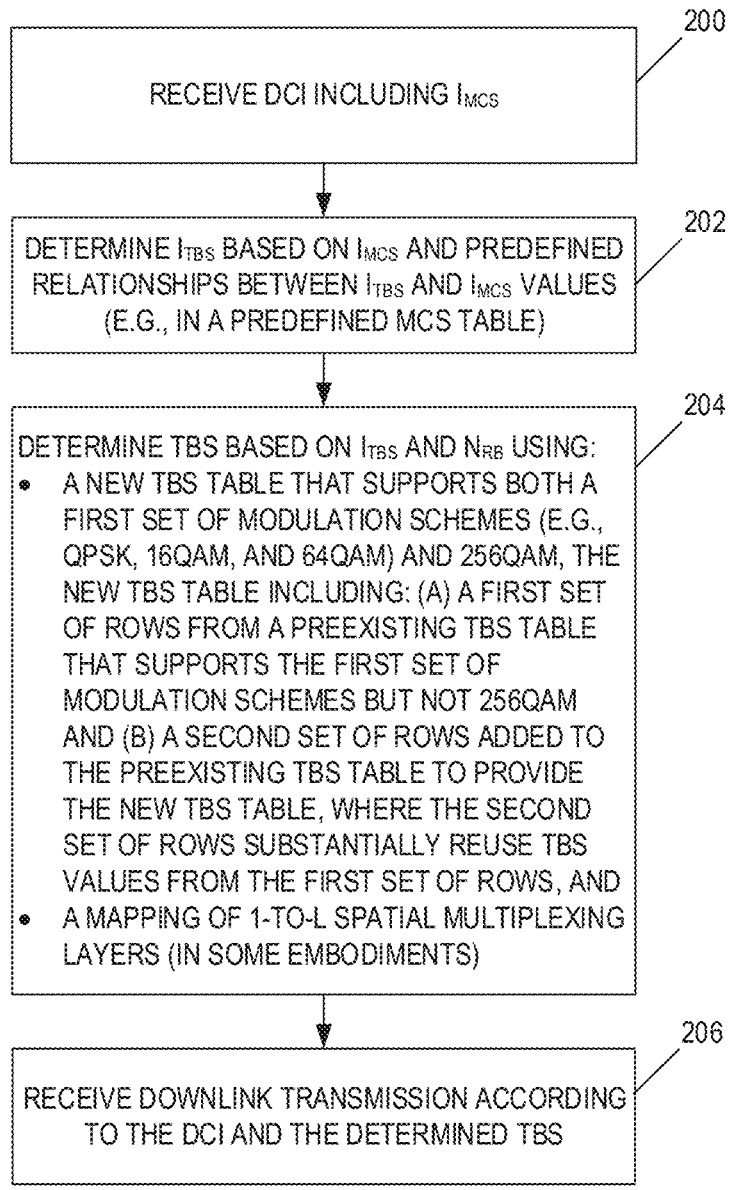
FIG. 17 is a flow chart that illustrates the operation of the wireless device to utilize a new TBS table that supports 256QAM according to some embodiments of the present disclosure.

FIG. 17 is a flow chart that illustrates the operation of the wireless device 20 in more detail according to some embodiments of the present disclosure. This process corresponds to steps 106 through 112 of FIG. 16. As illustrated, the wireless device 20 receives DCI including the MCS index ($I_{MCS}$) for the corresponding PDSCH transmission to the wireless device 20 (step 200). The wireless device 20 determines the TBS index ($I_{TBS}$) based on the MCS index ($I_{MCS}$) and predefined relationships between the TBS index ($I_{TBS}$) values and the MCS index ($I_{MCS}$) values (e.g., in a predefined MCS table) (step 202). The wireless device 20 then determines the TBS for the PDSCH transmission based on the TBS index ($I_{TBS}$) and the number of resource blocks ($N_{RB}$) using a new TBS table that supports both a first set of modulation schemes (e.g., QPSK, 16QAM, and 64QAM)

and 256QAM (step 204). The new TBS table includes: (a) a first set of rows from a preexisting TBS table (e.g., a TBS table for LTE Release 11) that supports the first set of modulation schemes but not 256QAM and (b) a second set of rows added to the preexisting TBS table to provide the new TBS table, where the second set of rows substantially reuse TBS values from the first set of rows from the preexisting TBS table. In some embodiments, if spatial multiplexing is used for the PDSCH transmission (e.g., two or more spatial layers), the TBS for the PDSCH transmission is further determined using a defined mapping of the appropriate TBS value for one spatial layer to a TBS value for L spatial layers, where L is the number of spatial layers used for the PDSCH transmission and L>1. The wireless device 20 then receives the downlink transmission according to the DCI and the determined TBS (step 206).

The new TBS table has an efficient design by substantially reusing TBS values from the first set of rows, where the first set of rows are the rows of the preexisting TBS table. Two exemplary benefits with this are: reusing the existing TBS values minimizes the LTE standards impacts and implementation efforts, and only a few new TBS values are added to the existing 229 TBS values in the new TBS table to support 256QAM. This allows the TBS table to be stored with 8-bit indices instead of 19-bit integers, which reduces the storage requirement by at least half.

In some embodiments, in order to support 256QAM, six additional rows of TBS are added to the existing 27×110 TBS table for one spatial layer, according to one example. By allowing up to 2% deviation from the target code rates for the corresponding MCSs, the second set of rows (six rows×110 entries per row) added to the preexisting 27×110 TBS table can be designed without introducing any new TBS values. One example of such a design is illustrated in FIGS. 18A through 18D. Note that FIGS. 18A through 18D only illustrate rows 27 through 32 of the new TBS table (i.e., the second set of rows), whereas rows 0 through 26 of the new TBS table (i.e., the first set of rows) are the same as rows in the LTE Release 11 TBS table illustrated in FIGS. 7A through 7K. Note that the example of FIGS. 18A through 18D is only one example. Other examples that follow the design principles described herein may alternatively be used.

Notably, in the embodiment of FIGS. 18A through 18D, rows 27 through 32 of the new TBS table substantially reuse the TBS values from the preexisting LTE Release 11 TBS table. In particular, there are only eight new TBS values, where the eight new TBS values are: 76,208, 78,704, 81,176, 84,760, 87,936, 90,816, 93,800, and 97,896. Note, however, that these eight new values are only one example. More generally, the new rows of the new TBS table (i.e., the second set of rows) include N new TBS values, where N<<M and M is the total number of TBS table entries in the new rows.

Figure 19:
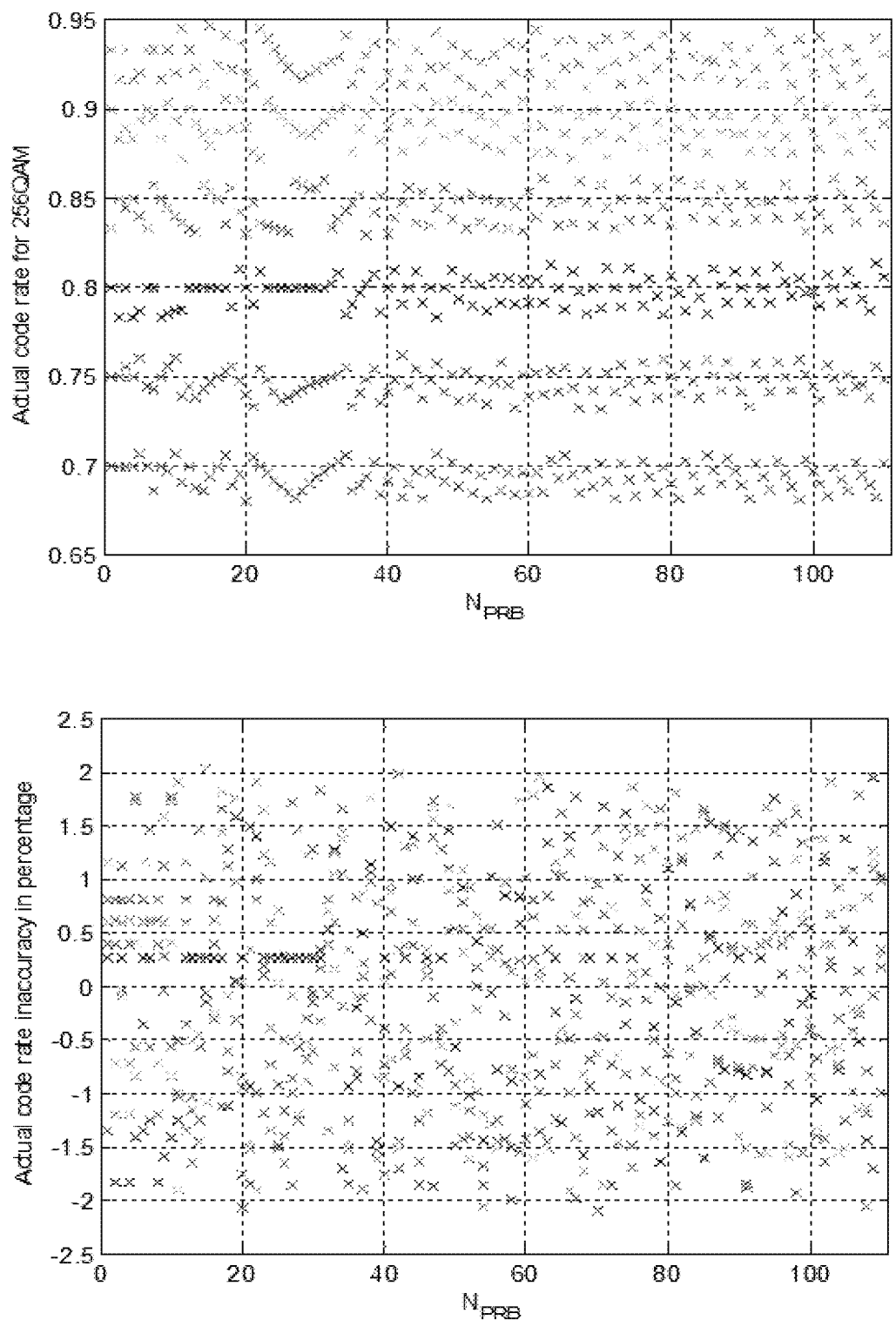
FIG. 19 illustrates a deviation of an actual code rate achieved by the TBS values in the new set of rows illustrated in FIGS. 18A through 18D according to one example embodiment of the present disclosure.

FIG. 19 illustrates the actual code rates and the inaccuracy of the code rates for the TBS values from the TBS table of FIGS. 18A through 18D for 256QAM according to one example. Notably, in this example, the target code rates are defined by the new MCS table given above. Note, however, that this is only one example of a new MCS table that can be used to provide support for 256QAM in addition to QPSK, 16QAM, and 64QAM. The same design principles described herein can be used to generate the second set of rows for the new TBS table based on any suitable MCS table designed to support QPSK, 16QAM, 64QAM, and 256QAM.

To support 256QAM transport blocks mapped to multiple spatial multiplexing layers, eight new mappings may be employed for TBS=76,208, 78,704, 81,176, 84,760, 87,936, 90,816, 93,800 and 97,896 for each of the one-to-two, one-to-three, and one-to-four TBS translation tables. Specifically, in some embodiments, by allowing mapping inaccuracy of ±0.4%, the additional one-layer to two-layer mappings can be supported without introducing any new TBS values, as shown in FIG. 20. In particular, these mappings reuse values from the preexisting mappings defined in LTE Release 11 such that no new TBS values are introduced. In some embodiments, by allowing mapping inaccuracy of ±1.25%, the additional one-layer to three-layer mappings can be supported without introducing any new TBS values, as shown in FIG. 21. Again, the mappings of FIG. 21 reuse values from the preexisting mappings defined in LTE Release 11 such that no new TBS values are introduced. In some embodiments, the additional one-layer to four-layer mappings are supported using eight new TBS values as illustrated in FIG. 22. In other words, the TBS values for the one-layer to four-layer mappings illustrated in FIG. 22 use new TBS values that are not used in either the LTE Release 11 TBS table or the LTE Release 11 one-layer to two, three, or four-layer mappings. Overall, the example of the new TBS table in FIGS. 18A through 18D adds eight new TBS values, and the example of the mappings in FIGS. 20 through 22 adds eight more new TBS values. When combined with the 229 unique TBS values in LTE Release 11, this results in 245 unique TBS values. This allows the TBS table to be stored with 8-bit indices instead of 19-bit integers, which reduces storage requirements by at least half.

In some other embodiments, the new rows (i.e., the second set of rows) of the new TBS table are designed by setting a peak rate by the largest TBS for the number of Physical Resource Blocks (PRBs) ($N_{PRB}$)=100 according to LTE Release 8 design principles. Based on this, in some embodiments, the new TBS table is the same as that described above with respect to FIGS. 18A through 18D for $N_{PRB} \leq 100$. For $N_{PRB} > 100$, the maximum TBS value is set to the largest TBS value for $N_{PRB}=100$, which in this example is 87,936. The resulting rows of the new TBS table for $N_{PRB} > 100$ are illustrated in FIG. 23.

Notably, in the embodiment of FIG. 23, rows 27 through 32 of the new TBS table substantially reuse the TBS values from the preexisting LTE Release 11 TBS table. In particular, there are only five new TBS values, where the five new TBS values are: 76,208, 78,704, 81,176, 84,760, and 87,936. Note, however, that these five new values are only one example. More generally, the new rows of the new TBS table (i.e., the second set of rows) include N new TBS values, where N<<M and M is the total number of TBS table entries in the new rows.

To support 256QAM transport blocks mapped to multiple spatial multiplexing layers, five new mappings may be employed for TBS=76,208, 78,704, 81,176, 84,760, and 87,936 for each of the one-to-two, one-to-three, and one-to-four TBS translation tables. Specifically, in some embodiments, by allowing mapping inaccuracy of ±0.4%, the additional one-layer to two-layer mappings can be supported without introducing any new TBS values, as shown in FIG. 24. In particular, these mappings reuse values from the preexisting mappings defined in LTE Release 11 such that no new TBS values are introduced. In some embodiments, by allowing mapping inaccuracy of ±1.25%, the additional one-layer to three-layer mappings can be supported without introducing any new TBS values, as shown in FIG. 25. Again, the mappings of FIG. 25 reuse values from the preexisting mappings defined in LTE Release 11 such that no new TBS values are introduced. In some embodiments, the additional one-layer to four-layer mappings are supported using five new TBS values as illustrated in FIG. 26. In other words, the TBS values for the one-layer to four-layer mappings illustrated in FIG. 26 use five new TBS values that are not used in either the LTE Release 11 TBS table or the LTE Release 11 one-layer to two, three, or four-layer mappings. Overall, the example of the new TBS table in FIG. 23 adds five new TBS values, and the example of the mappings in FIGS. 24 through 26 adds five more new TBS values. When combined with the 229 unique TBS values in LTE Release 11, this results in 239 unique TBS values. This allows the TBS table to be stored with 8-bit indices instead of 19-bit integers, which reduces storage requirement by at least half.

In other embodiments, the new TBS table may be designed to allow a slightly higher code rate for $N_{PRB}=100$, but still follows the same design principles as described above for the embodiment of FIG. 23. In one example, this introduces a new TBS value of 88,896 and allows slightly higher peak rate. The code rate for $N_{PRB}=100$ and this TBS value=88,896 results in a code rate of exactly 0.930. The resulting TBS table is the same as in the TBS table of FIGS. 18A through 18D for the TBS up to $N_{PRB}=90$. The case for $N_{PRB}>90$ is given in FIG. 27.

Notably, in the embodiment of FIG. 27, rows 27 through 32 of the new TBS table substantially reuse the TBS values from the preexisting LTE Release 11 TBS table. In particular, there are only six new TBS values, where the six new TBS values are: 76,208, 78,704, 81,176, 84,760, 87,936, and 88,896. Note, however, that these six new values are only one example. More generally, the new rows of the new TBS table (i.e., the second set of rows) include N new TBS values, where N<<M and M is the total number of TBS table entries in the new rows.

To support 256QAM transport blocks mapped to multiple spatial multiplexing layers, six new mappings may be employed for TBS=76,208, 78,704, 81,176, 84,760, 87,936, and 88,896 for each of the one-to-two, one-to-three, and one-to-four TBS translation tables. Specifically, in some embodiments, by allowing mapping inaccuracy of ±0.4%, the additional one-layer to two-layer mappings can be supported without introducing any new TBS values, as shown in FIG. 28. In particular, these mappings reuse values from the preexisting mappings defined in LTE Release 11 such that no new TBS values are introduced. In some embodiments, by allowing mapping inaccuracy of ±1%, the additional one-layer to three-layer mappings can be supported without introducing any new TBS values, as shown in FIG. 29. Again, the mappings of FIG. 29 reuse values from the preexisting mappings defined in LTE Release 11 such that no new TBS values are introduced. In some embodiments, the additional one-layer to four-layer mappings are supported using six new TBS values as illustrated in FIG. 30. In other words, the TBS values for the one-layer to four-layer mappings illustrated in FIG. 30 use six new TBS values that are not used in either the LTE Release 11 TBS table or the LTE Release 11 one-layer to two, three, or four-layer mappings. Overall, the example of the new TBS table in FIG. 27 adds six new TBS values, and the example of the mappings in FIGS. 28 through 30 adds six more new TBS values. When combined with the 229 unique TBS values in LTE Release 11, this results in 241 unique TBS values. This allows the TBS table to be stored with 8-bit indices instead of 19-bit integers, which reduces storage requirement by at least half.

Figure 31:
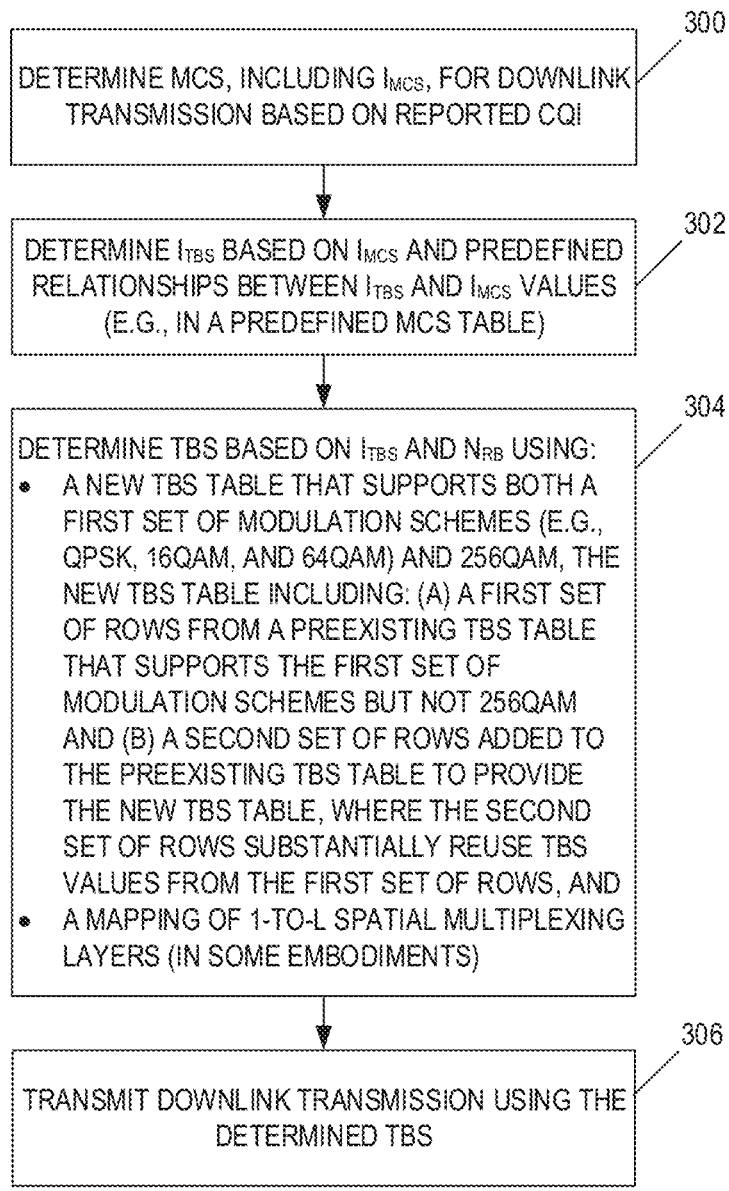
FIG. 31 is a flow chart that illustrates the operation of the base station to utilize a new TBS table that supports 256QAM according to some embodiments of the present disclosure.

Notably, FIG. 17 above illustrates a process by which the wireless device 20 utilizes the new TBS table to receive a downlink transmission. However, the new TBS table can also be used by radio access nodes such as the base station 16-1 to transmit downlink transmissions (e.g., to transmit PDSCH). In this regard, FIG. 31 illustrates the operation of the base station 16 to utilize the new TBS table according to some embodiments of the present disclosure. This process corresponds to steps 102 through 106 of FIG. 16. As illustrated, the base station 16 determines a MCS, including a MCS index ($I_{MCS}$), for a downlink transmission (e.g., a PDSCH transmission) to the wireless device 20 based on a CQI reported by the wireless device 20 (step 300). The base station 16 determines the appropriate TBS index ($I_{TBS}$) based on the MCS index ($I_{MCS}$) and predefined relationships between the TBS index ($I_{TBS}$) values and the MCS index ($I_{MCS}$) values (e.g., in a predefined MCS table) (step 302). The base station 16 then determines the TBS for the PDSCH transmission based on the TBS index ($I_{TBS}$) and the number of resource blocks ($N_{RB}$) using the new TBS table that supports both the first set of modulation schemes (e.g., QPSK, 16QAM, and 64QAM) and 256QAM (step 304). The new TBS table includes: (a) the first set of rows from the preexisting TBS table (e.g., a TBS table for LTE Release 11) that supports the first set of modulation schemes but not 256QAM and (b) the second set of rows added to the preexisting TBS table to provide the new TBS table, where the second set of rows substantially reuse TBS values from the first set of rows from the preexisting TBS table, as described above. In some embodiments, if spatial multiplexing is used for the PDSCH transmission (e.g., two or more spatial layers), the TBS for the PDSCH transmission is further determined using a defined mapping of the appropriate TBS value for one spatial layer to a TBS value for L spatial layers, where L is the number of spatial layers used for the PDSCH transmission and L>1. The base station 16 then transmits the downlink transmission to the wireless device 20 using the determined TBS (step 306). As discussed above, in some embodiments, the downlink transmission is a PDSCH transmission, and the MCS index ($I_{MCS}$) is transmitted to the wireless device 20 along with other control information in the corresponding DCI.

Figure 32:
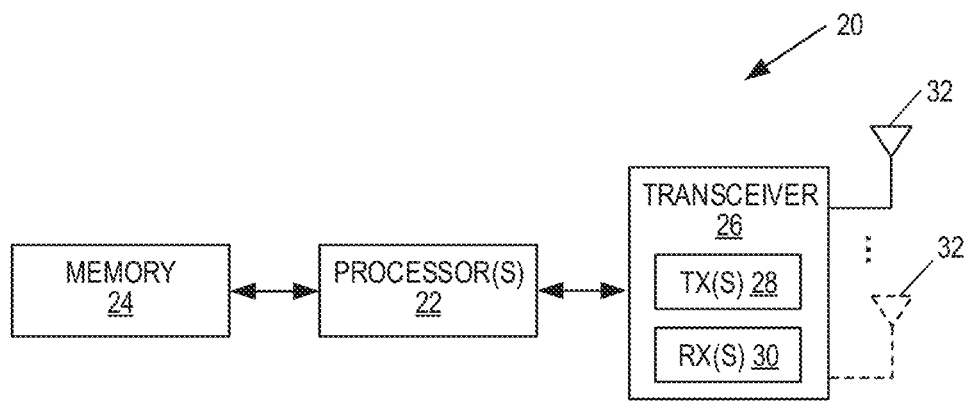
FIG. 32 is a block diagram of the wireless device according to some embodiments of the present disclosure.

FIG. 32 is a block diagram of the wireless device 20 according to some embodiments of the present disclosure. As illustrated, the wireless device 20 includes one or more processors 22 (e.g., Central Processing Unit(s) (CPU(s)), Application Specific Integrated Circuit(s) (ASIC(s)), Field Programmable Gate Array(s) (FPGA(s))), memory 24, and a transceiver 26 including one or more transmitters 28 and one or more receivers 30 coupled to one or more antennas 32. In some embodiments, the functionality of the wireless device 20 described herein is implemented in software stored in the memory 24, where the software is executed by the processor (s) 22 such that the wireless device 20 operates according to any of the embodiments described herein.

In some embodiments, a computer program including instructions which, when executed by at least one processor, causes the at least one processor to carry out the functionality of the wireless device 20 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 24).

Figure 33:
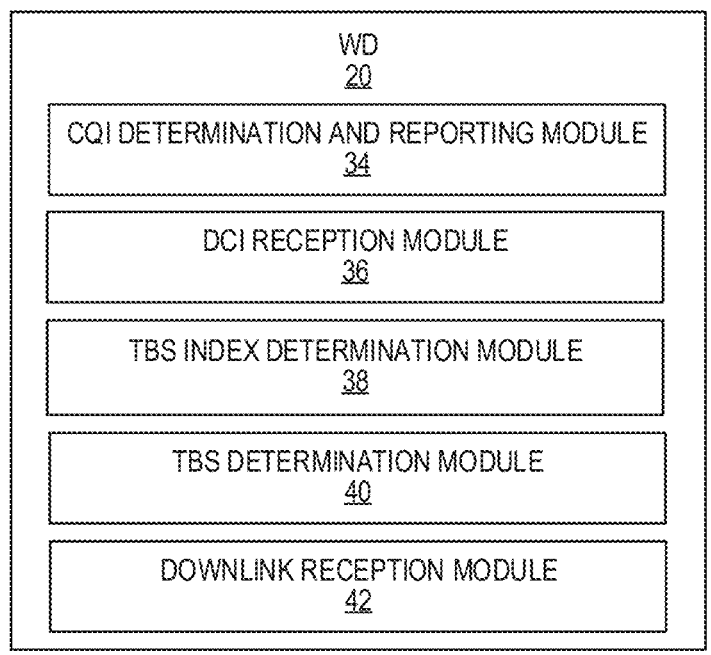
FIG. 33 is a block diagram of the wireless device according to some other embodiments of the present disclosure.

FIG. 33 is a block diagram of the wireless device 20 according to some other embodiments of the present disclosure. As illustrated, the wireless device 20 includes a CQI determination and reporting module 34, a DCI reception module 36, a TBS index determination module 38, a TBS determination module 40, and a downlink reception module 42, each of which is implemented in software. In some embodiments, the CQI determination and reporting module 34 determines CQI for the downlink channel from the base station 16 to the wireless device 20 and reports the CQI to the base station 16 via an associated transmitter (not shown) of the wireless device 20. The DCI reception module 36 receives, via an associated receiver (not shown) of the wireless device 20, DCI transmitted from the base station 16 to the wireless device 20. Based on the MCS index ($I_{MCS}$) included in the DCI, the TBS index determination module 38 operates to determine the corresponding TBS index ($I_{TBS}$) for the new TBS table. The TBS determination module 40 then uses the TBS index ($I_{TBS}$) to determine the appropriate TBS size from the new TBS table, as described above. The downlink reception module 42 then receives a downlink transmission from the base station 16 to the wireless device 20 according to the DCI and the determined TBS.

Figure 34:
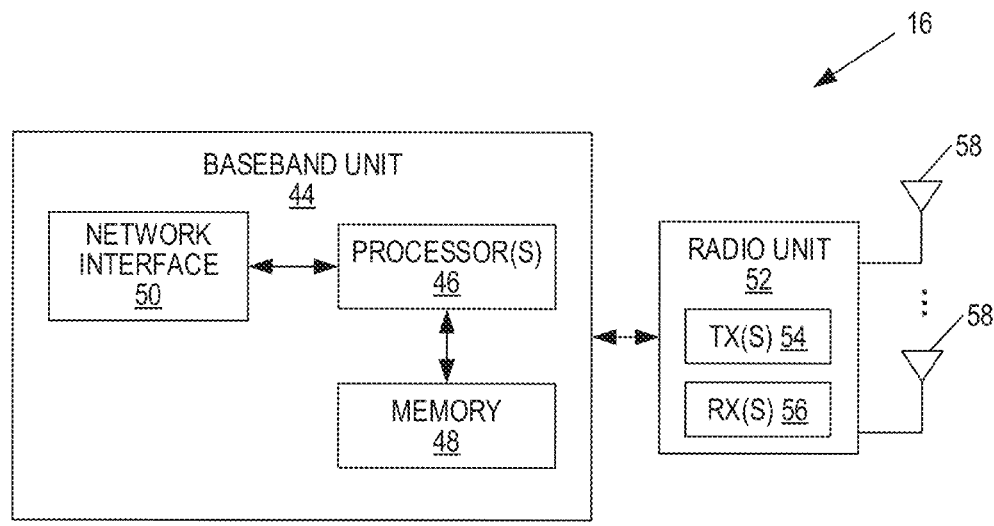
FIG. 34 is a block diagram of the base station according to some embodiments of the present disclosure.

FIG. 34 is a block diagram of the base station 16 according to some embodiments of the present disclosure. As illustrated, the base station 16 includes a baseband unit 44 including one or more processors 46 (e.g., CPU(s), ASIC(s), and/or FPGA(s)), memory 48, and a network interface 50. In addition, the base station 16 includes a radio unit 52 including one or more transmitters 54 and one or more receivers 56 coupled to one or more antennas 58. In some embodiments, the functionality of the base station 16 is implemented in software and stored in the memory 48 for execution by the processor(s) 46.

In some embodiments, a computer program including instructions which, when executed by at least one processor, causes the at least one processor to carry out the functionality of the base station 16 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 48).

Figure 35:
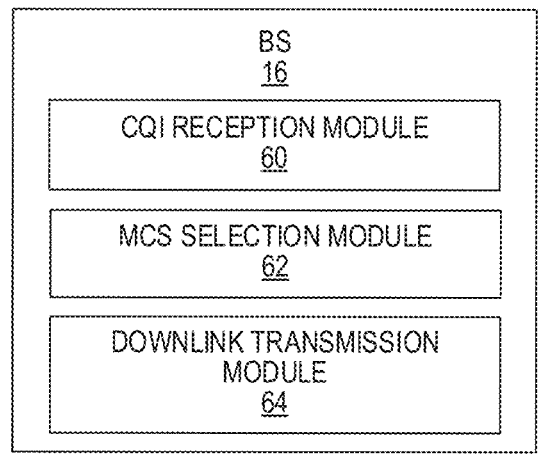
FIG. 35 is a block diagram of the base station according to some other embodiments of the present disclosure.

FIG. 35 is a block diagram of the base station 16 according to some other embodiments of the present disclosure. As illustrated, the base station 16 includes a CQI reception module 60, a MCS selection module 62, and a downlink transmission module 64, each of which is implemented in software. The CQI reception module 60 operates to receive, via an associated receiver of the base station 16 (not shown), CQI from the wireless device 20. Based on the CQI, the MCS selection module 62 selects, or determines, a MCS for a downlink transmission to the wireless device 20. The downlink transmission module 64 uses the corresponding MCS index ($I_{MCS}$) of the selected MCS to determine the corresponding TBS index ($I_{TBS}$) for the new TBS table. The downlink transmission module 64 then uses the TBS index ($I_{TBS}$) and the number of PRBs ($N_{PRB}$) scheduled/allocated for the downlink transmission to determine the appropriate TBS size for the downlink transmission from the new TBS table, as described above. The downlink transmission module 64 then transmits the downlink transmission to the wireless device 20 via an associated transmitter (not shown).

The result of the embodiments disclosed herein is cost-efficient techniques to introduce 256QAM by using the preexisting TBS tables to at least a substantial extent.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

While concepts have been described in terms of several embodiments, those skilled in the art will recognize that the concepts disclosed herein are not limited to the embodiments described, can be practiced with modification and alteration within the spirit and scope of the appended claims. The description is thus to be regarded as illustrative instead of limiting.

The following acronyms are used throughout this disclosure.

3GPP 3$^{rd}$ Generation Partnership Project
ASIC Application Specific Integrated Circuit
CFI Control Format Indicator
CPU Central Processing Unit
CQI Channel Quality Information
dB Decibel
DCI Downlink Control Information
DFT Discrete Fourier Transform
eNB Enhanced or Evolved Node B
EPC Enhanced or Evolved Packet Core
EPDCCH Enhanced Physical Downlink Control Channel
EPS Enhanced or Evolved Packet System
E-UTRAN Evolved Universal Terrestrial Radio Access Network
EVM Error Vector Magnitude
FPGA Field Programmable Gate Array
HARQ Hybrid Automatic Repeat Request
LTE Long Term Evolution
MCS Modulation Coding Scheme
ms Millisecond
OFDM Orthogonal Frequency Division Multiplexing
PDCCH Physical Downlink Control Channel
PDSCH Physical Downlink Shared Channel
PRB Physical Resource Block
QAM Quadrature Amplitude Modulation
QPSK Quadrature Phase-Shift Keying
RAN Radio Access Network
RRH Remote Radio Head
SINR Signal-to-Interference-and-Noise Ratio
SNR Signal-to-Noise Ratio
TBS Transport Block Size
UE User Equipment
VRB Virtual Resource Block
W-CDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device to receive a downlink transmission from a radio access node of a 3$^{rd}$ Generation Partnership Project, 3GPP, Long Term Evolution, LTE, network to the wireless device, comprising:
receiving downlink control information transmitted by the radio access node, the downlink control information comprising a Modulation and Coding Scheme, MCS, index indicative of a MCS used for a downlink transmission from the radio access node to the wireless device;
determining a Transport Block Size, TBS, index based on the MCS index and predefined relationships between TBS index values and MCS index values;

determining a TBS for the downlink transmission from the radio access node to the wireless device based on the TBS index and a number of resource blocks, $N_{RB}$, scheduled for the downlink transmission using a TBS table that supports both a first set of modulation schemes and 256 Quadrature Amplitude Modulation, 256QAM, the TBS table comprising:
  (a) a first set of rows from a preexisting TBS table that supports the first set of modulation schemes but not 256QAM and
  (b) a second set of rows added to the preexisting TBS table to provide the TBS table, where the second set of rows substantially reuse TBS values from the first set of rows;
where the first set of modulation schemes consists of Quadrature Phase-Shift Keying, QPSK, 16 Quadrature Amplitude Modulation, 16QAM, and 64QAM, N=8, and eight new TBS values are: 76,208, 78,704, 81,176, 84,760, 87,936, 90,816, 93,800, and 97,896 and a predefined mapping of the eight new TBS values in the second set of rows in the TBS table from values for one spatial multiplexing layer to values for four spatial multiplexing layers as follows:
  76,208 is mapped to 305,976 for four spatial multiplexing layers;
  78,704 is mapped to 314,888 for four spatial multiplexing layers;
  84,760 is mapped to 339,112 for four spatial multiplexing layers;
  90,816 is mapped to 363,336 for four spatial multiplexing layers;
  93,800 is mapped to 375,448 for four spatial multiplexing layers; and
  97,896 is mapped to 391,656 for four spatial multiplexing layers; and
receiving the downlink transmission from the radio access node according to the downlink control information and the TBS determined for the downlink transmission.

2. The method of claim 1 wherein the downlink transmission uses L spatial multiplexing layers, where L>1, and determining the TBS for the downlink transmission based on the TBS index further uses a predefined mapping of at least some of the TBS values in the TBS table from values for one spatial multiplexing layer to values for L spatial multiplexing layers.

3. The method of claim 1 wherein the second set of rows in the TBS table comprise N new TBS values that are not included in the first set of rows from the preexisting TBS table, where N<<M and M is a total number of table entries in the second set of rows.

4. The method of claim 3 wherein the downlink transmission uses L spatial multiplexing layers, where L>1, and determining the TBS for the downlink transmission based on the TBS index further uses a predefined mapping of the N new TBS values in the second set of rows in the TBS table from values for one spatial multiplexing layer to values for L spatial multiplexing layers.

5. The method of claim 3 wherein the TBS table is such that a maximum TBS value in the TBS table for $N_{RB}=100$ is used as a peak TBS value in the TBS table for $N_{RB}>100$.

6. A wireless device enabled to receive a downlink transmission from a radio access node of a 3$^{rd}$ Generation Partnership Project, 3GPP, Long Term Evolution, LTE, network to the wireless device, comprising:
  a receiver;
  at least one processor; and
  memory containing software instructions executable by the at least one processor whereby the wireless device is operative to:
    receive, via the receiver, downlink control information transmitted by the radio access node, the downlink control information comprising a Modulation and Coding Scheme, MCS, index indicative of a MCS used for a downlink transmission from the radio access node to the wireless device;
    determine a Transport Block Size, TBS, index based on the MCS index and predefined relationships between TBS index values and MCS index values;
    determine a TBS for the downlink transmission from the radio access node to the wireless device based on the TBS index and a number of resource blocks, $N_{RB}$, scheduled for the downlink transmission using a TBS table that supports both a first set of modulation schemes and 256 Quadrature Amplitude Modulation, 256QAM, the TBS table comprising:
      (a) a first set of rows from a preexisting TBS table that supports the first set of modulation schemes but not 256QAM and
      (b) a second set of rows added to the preexisting TBS table to provide the TBS table, where the second set of rows substantially reuse TBS values from the first set of rows;
    where the first set of modulation schemes consists of Quadrature Phase-Shift Keying, QPSK, 16 Quadrature Amplitude Modulation, 16QAM, and 64QAM, N=8, and eight new TBS values are: 76,208, 78,704, 81,176, 84,760, 87,936, 90,816, 93,800, and 97,896 and a predefined mapping of the eight new TBS values in the second set of rows in the TBS table from values for one spatial multiplexing layer to values for four spatial multiplexing layers as follows:
      76,208 is mapped to 305,976 for four spatial multiplexing layers;
      78,704 is mapped to 314,888 for four spatial multiplexing layers;
      84,760 is mapped to 339,112 for four spatial multiplexing layers;
      90,816 is mapped to 363,336 for four spatial multiplexing layers;
      93,800 is mapped to 375,448 for four spatial multiplexing layers; and
      97,896 is mapped to 391,656 for four spatial multiplexing layers; and
    receive, via the receiver, the downlink transmission from the radio access node according to the downlink control information and the TBS determined for the downlink transmission.

7. A method of operation of a radio access node in a 3$^{rd}$ Generation Partnership Project, 3GPP, Long Term Evolution, LTE, network to transmit a downlink transmission from the radio access node to a wireless device, comprising:
  determining a Modulation and Coding Scheme, MCS, for a downlink transmission from the radio access node to the wireless device, the MCS having a corresponding MCS index;
  determining a Transport Block Size, TBS, index based on the MCS index and predefined relationships between TBS index values and MCS index values;
  determining a TBS for the downlink transmission from the radio access node to the wireless device based on the TBS index and a number of resource blocks, $N_{RB}$, scheduled for the downlink transmission using a TBS table that supports both a first set of modulation schemes and 256 Quadrature Amplitude Modulation, 256QAM, the TBS table comprising:
(a) a first set of rows from a preexisting TBS table that supports the first set of modulation schemes but not 256QAM and
(b) a second set of rows added to the preexisting TBS table to provide the TBS table, where the second set of rows substantially reuse TBS values from the first set of rows;
where the first set of modulation schemes consists of Quadrature Phase-Shift Keying, QPSK, 16 Quadrature Amplitude Modulation, 16QAM, and 64QAM, N=8, and eight new TBS values are: 76,208, 78,704, 81,176, 84,760, 87,936, 90,816, 93,800, and 97,896 and a predefined mapping of the eight new TBS values in the second set of rows in the TBS table from values for one spatial multiplexing layer to values for four spatial multiplexing layers as follows:
76,208 is mapped to 305,976 for four spatial multiplexing layers;
78,704 is mapped to 314,888 for four spatial multiplexing layers;
84,760 is mapped to 339,112 for four spatial multiplexing layers;
90,816 is mapped to 363,336 for four spatial multiplexing layers;
93,800 is mapped to 375,448 for four spatial multiplexing layers; and
97,896 is mapped to 391,656 for four spatial multiplexing layers; and
transmitting the downlink transmission from the radio access node to the wireless device using the TBS determined for the downlink transmission.

8. The method of claim 7 wherein the downlink transmission uses L spatial multiplexing layers, where L>1, and determining the TBS for the downlink transmission based on the TBS index further uses a predefined mapping of at least some of the TBS values in the TBS table from values for one spatial multiplexing layer to values for L spatial multiplexing layers.

9. The method of claim 7 wherein the second set of rows in the TBS table comprise N new TBS values that are not included in the first set of rows from the preexisting TBS table, where N<<M and M is a total number of table entries in the second set of rows.

10. The method of claim 9 wherein the downlink transmission uses L spatial multiplexing layers, where L>1, and determining the TBS for the downlink transmission based on the TBS index further uses a predefined mapping of the N new TBS values in the second set of rows in the TBS table from values for one spatial multiplexing layer to values for L spatial multiplexing layers.

11. The method of claim 9 wherein the TBS table is such that a maximum TBS value in the TBS table for $N_{RB}=100$ is used as a peak TBS value in the TBS table for $N_{RB}>100$.

12. A radio access node in a cellular communications network enabled to transmit a downlink transmission from the radio access node to a wireless device, comprising:
a transmitter;
at least one processor; and
memory containing software instructions executable by the at least one processor whereby the radio access node is operative to:
determine a Modulation and Coding Scheme, MCS, for a downlink transmission from the radio access node to the wireless device, the MCS having a corresponding MCS index;
determine a Transport Block Size, TBS, index based on the MCS index and predefined relationships between TBS index values and MCS index values;
determine a TBS for the downlink transmission from the radio access node to the wireless device based on the TBS index and a number of resource blocks, $N_{RB}$, scheduled for the downlink transmission using a TBS table that supports both a first set of modulation schemes and 256 Quadrature Amplitude Modulation, 256QAM, the TBS table comprising:
(a) a first set of rows from a preexisting TBS table that supports the first set of modulation schemes but not 256QAM and
(b) a second set of rows added to the preexisting TBS table to provide the TBS table, where the second set of rows substantially reuse TBS values from the first set of rows;
where the first set of modulation schemes consists of Quadrature Phase-Shift Keying, QPSK, 16 Quadrature Amplitude Modulation, 16QAM, and 64QAM, N=8, and eight new TBS values are: 76,208, 78,704, 81,176, 84,760, 87,936, 90,816, 93,800, and 97,896 and a predefined mapping of the eight new TBS values in the second set of rows in the TBS table from values for one spatial multiplexing layer to values for four spatial multiplexing layers as follows:
76,208 is mapped to 305,976 for four spatial multiplexing layers;
78,704 is mapped to 314,888 for four spatial multiplexing layers;
84,760 is mapped to 339,112 for four spatial multiplexing layers;
90,816 is mapped to 363,336 for four spatial multiplexing layers;
93,800 is mapped to 375,448 for four spatial multiplexing layers; and
97,896 is mapped to 391,656 for four spatial multiplexing layers; and
transmit, via the transmitter, the downlink transmission from the radio access node to the wireless device using the TBS determined for the downlink transmission.

\* \* \* \* \*

UNITED STATES PATENT AND TRADEMARK OFFICE
CERTIFICATE OF CORRECTION

PATENT NO. : 9,736,830 B2
APPLICATION NO. : 14/597743
DATED : August 15, 2017
INVENTOR(S) : Cheng et al.

It is certified that error appears in the above-identified patent and that said Letters Patent is hereby corrected as shown below:

In the Specification

In Column 6, Line 45, delete "Information" and insert -- Indicator --, therefor.

In Column 18, Line 18, delete "Information" and insert -- Indicator --, therefor.

In the Claims

In Column 19, Line 10, in Claim 1, delete "256QAM and" and insert -- 256QAM; and --, therefor.

In Column 20, Line 22, in Claim 6, delete "256QAM and" and insert -- 256QAM; and --, therefor.

In Column 21, Line 5, in Claim 7, delete "256QAM and" and insert -- 256QAM; and --, therefor.

In Column 22, Line 24, in Claim 12, delete "256QAM and" and insert -- 256QAM; and --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*